US009815976B2

(12) United States Patent
Lu et al.

(10) Patent No.: US 9,815,976 B2
(45) Date of Patent: Nov. 14, 2017

(54) POLY(VINYL ACETAL) RESIN COMPOSITIONS, LAYERS, AND INTERLAYERS HAVING ENHANCED OPTICAL PROPERTIES

(71) Applicant: Solutia Inc., St. Louis, MO (US)

(72) Inventors: Jun Lu, East Longmeadow, MA (US); Wenjie Chen, Amherst, MA (US); Helen M. Thompson, Somers, CT (US)

(73) Assignee: Solutia Inc., St. Louis, MO (US)

( * ) Notice: Subject to any disclaimer, the term of this patent is extended or adjusted under 35 U.S.C. 154(b) by 34 days.

(21) Appl. No.: 14/563,378

(22) Filed: Dec. 8, 2014

(65) Prior Publication Data
US 2016/0160029 A1  Jun. 9, 2016

(51) Int. Cl.
| | | |
|---|---|---|
| *C08L 29/14* | (2006.01) | |
| *B32B 27/30* | (2006.01) | |
| *B32B 17/10* | (2006.01) | |
| *B32B 7/02* | (2006.01) | |
| *B29C 47/06* | (2006.01) | |
| *B32B 27/08* | (2006.01) | |
| *B32B 27/22* | (2006.01) | |
| *B32B 27/36* | (2006.01) | |
| *B29C 47/00* | (2006.01) | |
| *B29K 31/00* | (2006.01) | |
| *B29L 7/00* | (2006.01) | |
| *B29L 9/00* | (2006.01) | |

(52) U.S. Cl.
CPC ............ *C08L 29/14* (2013.01); *B29C 47/065* (2013.01); *B32B 7/02* (2013.01); *B32B 17/10605* (2013.01); *B32B 17/10614* (2013.01); *B32B 17/10761* (2013.01); *B32B 27/08* (2013.01); *B32B 27/22* (2013.01); *B32B 27/306* (2013.01); *B32B 27/36* (2013.01); *B29C 47/0021* (2013.01); *B29C 47/0064* (2013.01); *B29K 2031/00* (2013.01); *B29L 2007/008* (2013.01); *B29L 2009/00* (2013.01); *B32B 2270/00* (2013.01); *B32B 2307/412* (2013.01); *B32B 2307/418* (2013.01); *B32B 2307/558* (2013.01); *B32B 2307/732* (2013.01); *B32B 2419/00* (2013.01); *B32B 2457/00* (2013.01); *B32B 2551/00* (2013.01); *B32B 2571/02* (2013.01); *B32B 2605/006* (2013.01); *B32B 2607/02* (2013.01); *C08L 2205/025* (2013.01); *C08L 2205/03* (2013.01)

(58) Field of Classification Search
CPC ................ B32B 17/10761; B32B 7/02; B32B 17/10605; B32B 17/10614; C08L 29/14
See application file for complete search history.

(56) References Cited

U.S. PATENT DOCUMENTS

| | | |
|---|---|---|
| 2,282,026 A | 5/1942 | Bren et al. |
| 2,282,057 A | 5/1942 | Hopkins et al. |
| 2,456,366 A | 12/1948 | Bren et al. |
| 3,644,594 A | 2/1972 | Mont |
| 4,165,397 A | 8/1979 | Ogden et al. |
| 4,361,625 A | 11/1982 | Beckmann et al. |
| 4,874,814 A | 10/1989 | Cartier |
| 4,968,744 A | 11/1990 | Misra et al. |
| 5,169,897 A | 12/1992 | Walls |
| 5,190,826 A | 3/1993 | Asahina et al. |
| 5,290,660 A | 3/1994 | Eian et al. |
| 5,340,654 A | 8/1994 | Ueda et al. |
| 5,409,734 A | 4/1995 | Lee et al. |
| 5,593,786 A | 1/1997 | Parker et al. |
| 5,728,472 A | 3/1998 | D'Errico |
| 5,830,568 A * | 11/1998 | Kondo .................. B01D 61/44 296/84.1 |
| 6,733,872 B2 * | 5/2004 | Nagai ............... B32B 17/10036 428/215 |
| 6,984,679 B2 | 1/2006 | Papenfuhs et al. |
| 7,121,380 B2 | 10/2006 | Garnier et al. |
| 7,452,608 B2 | 11/2008 | Fukatani et al. |
| 7,510,771 B2 | 3/2009 | Lu |
| 7,854,993 B2 | 12/2010 | Lu |
| 7,883,761 B2 | 2/2011 | Bourcier et al. |
| 8,470,908 B2 | 6/2013 | Frank |
| 8,597,792 B2 | 12/2013 | Meise et al. |
| 8,715,815 B2 | 5/2014 | Shimamoto |
| 8,741,439 B2 | 6/2014 | Shimamoto et al. |
| 8,920,930 B2 | 12/2014 | Meise et al. |
| 9,114,595 B2 | 8/2015 | Bourcier et al. |
| 9,238,354 B2 | 1/2016 | Iwamoto |

(Continued)

FOREIGN PATENT DOCUMENTS

| | | |
|---|---|---|
| DE | 10343385 A1 | 4/2005 |
| DE | 102008001512 A1 | 11/2009 |

(Continued)

OTHER PUBLICATIONS

"Aerosil(R) MOX 170 MSDS". Evonik Industries, (Jun. 25, 2015); pp. 1-12.*
Hallensleben et al. "Polyvinyl Compounds, Others", Ullmann's Encyclopedia of Industrial Chemistry, (2015); pp. 1-23.*
Naje et al. "Effect of Indium Tin Oxide (ITO) Nanoparticles on the Optical Properties of PMMA Polymer", Journal of University of Kerbala, The International 3rd Scientific Conference of the College of Science, (2015); pp. 17-23.*
Althues et al. "Functional inorganic nanofillers for transparent polymers". Chem. Soc. Rev, (2007); pp. 1454-1465.*
"Chemical Information Profile for Indium Tin Oxide". National Toxicology Program, (2009); pp. 1-28.*

(Continued)

*Primary Examiner* — Prashant J Khatri
(74) *Attorney, Agent, or Firm* — Michelle Bugbee

(57) ABSTRACT

Resin compositions, layers, and interlayers comprising two or more thermoplastic polymers and at least one RI balancing agent for adjusting the refractive index of at least one of the resins or layers is provided. Such compositions, layers, and interlayers exhibit enhanced optical properties while retaining other properties, such as impact resistance and acoustic performance.

17 Claims, No Drawings

(56) References Cited

U.S. PATENT DOCUMENTS

| | | | |
|---|---|---|---|
| 2003/0139520 | A1 | 7/2003 | Toyama |
| 2004/0065229 | A1 | 4/2004 | Papenfuhs et al. |
| 2004/0219365 | A1* | 11/2004 | Yuan ................. B32B 17/10036 428/423.1 |
| 2005/0142332 | A1 | 6/2005 | Sauer |
| 2006/0008658 | A1 | 1/2006 | Fukatani et al. |
| 2006/0210776 | A1 | 9/2006 | Lu et al. |
| 2007/0036956 | A1 | 2/2007 | Chen et al. |
| 2007/0122629 | A1 | 5/2007 | Chen et al. |
| 2007/0148472 | A1 | 6/2007 | Masaki et al. |
| 2007/0248809 | A1 | 10/2007 | Haldeman et al. |
| 2007/0289693 | A1 | 12/2007 | Anderson et al. |
| 2008/0268270 | A1 | 10/2008 | Chen et al. |
| 2008/0280076 | A1 | 11/2008 | Hayes et al. |
| 2008/0286542 | A1 | 11/2008 | Hayes et al. |
| 2008/0306190 | A1 | 12/2008 | Weiss |
| 2009/0226750 | A1 | 9/2009 | Lu |
| 2009/0233090 | A1* | 9/2009 | Wong .................... B82Y 30/00 428/338 |
| 2009/0293952 | A1 | 12/2009 | Koran et al. |
| 2010/0028642 | A1 | 2/2010 | Steuer et al. |
| 2010/0040868 | A1 | 2/2010 | Fukatani et al. |
| 2010/0124647 | A1 | 5/2010 | Keller et al. |
| 2012/0133764 | A1 | 5/2012 | Hurlbut |
| 2012/0263958 | A1 | 10/2012 | Iwamoto et al. |
| 2012/0288722 | A1 | 11/2012 | Iwamoto |
| 2013/0022824 | A1 | 1/2013 | Meise et al. |
| 2013/0022825 | A1 | 1/2013 | Meise et al. |
| 2013/0157065 | A1* | 6/2013 | Shimamoto ....... B32B 17/10036 428/442 |
| 2013/0189527 | A1 | 7/2013 | Meise et al. |
| 2013/0236693 | A1* | 9/2013 | Lu ........................... B32B 27/08 428/141 |
| 2013/0236711 | A1 | 9/2013 | Lu |
| 2013/0274396 | A1 | 10/2013 | Arendt et al. |
| 2013/0323516 | A1 | 12/2013 | Shimamoto et al. |
| 2014/0000977 | A1 | 1/2014 | Matsuda et al. |
| 2014/0363651 | A1 | 12/2014 | Lu et al. |
| 2014/0363652 | A1 | 12/2014 | Lu et al. |
| 2014/0364549 | A1 | 12/2014 | Lu et al. |
| 2014/0364550 | A1 | 12/2014 | Lu |
| 2015/0158276 | A1 | 6/2015 | Thompson et al. |
| 2015/0258747 | A1 | 9/2015 | Miyai |
| 2015/0306853 | A1 | 10/2015 | Beekhuizen |
| 2016/0046783 | A1 | 2/2016 | Asanuma |
| 2016/0046784 | A1 | 2/2016 | Asanuma |

FOREIGN PATENT DOCUMENTS

| | | |
|---|---|---|
| JP | 05-104687 | 4/1993 |
| JP | 05-310449 | 11/1993 |
| JP | 09-156967 | 6/1997 |
| WO | WO 2010/108975 A1 | 9/2010 |
| WO | WO 2012/092366 | 7/2012 |

OTHER PUBLICATIONS

Wypych, G. "Sources of Fillers, Their Chemical Composition, Properties, and Morphology". Handbook of Fillers, 2nd ed., ChemTec Publishing, (2000); pp. 19-177.*
ChemicalBook, Triethylene glycol bis(2-ethylhexanoate), Access Jul. 13, 2015 by Examiner, First Page.
Ellis, Bryan and Ray Smith. "Polymers—A Property Database (2nd Edition)", Dec. 2009, Taylor & Francis, $2^{nd}$ Edition, p. 573.
Office Action dated Jul. 6, 2015 received in co-pending U.S. Appl. No. 14/299,975.
Office Action dated Jul. 8, 2015 received in co-pending U.S. Appl. No. 14/299,945.
Office Action dated Jul. 27, 2015 received in co-pending U.S. Appl. No. 14/505,191.
Office Action dated Jul. 27, 2015 received in co-pending U.S. Appl. No. 14/505,247.
Office Action dated Aug. 5, 2015 received in co-pending U.S. Appl. No. 14/300,612.
USPTO Notice of Allowance dated Sep. 9, 2015 for copending U.S. Appl. No. 14/299,996.
Copending U.S. Appl. No. 14/882,317, filed Oct. 13, 2015, Jun Lu, et al.
Office Action dated Nov. 2, 2015 received in co-pending U.S. Appl. No. 14/514,641.
Wade, B.E., Vinyl Acetal Polymers, in Encyclopedia of Polymer Science & Technology, 3rd edition, vol. 8, pp. 381-399, (2003).
Copending U.S. Appl. No. 14/299,945, filed Jun. 9, 2014, Jun Lu, et al. (Now Publication No. 2014-0363651).
Copending U.S. Appl. No. 14/300,612, filed Jun. 10, 2014, Jun Lu (Now Publication No. 2014-0364550).
Copending U.S. Appl. No. 14/299,975, filed Jun. 9, 2014, Jun Lu, et al. (Now Publication No. 2014-0363652).
Copending U.S. Appl. No. 14/299,996, filed Jun. 9, 2014, Jun Lu, et al. (Now Publication No. 2014-0364549).
PCT International Search Report and Written Opinion dated Aug. 29, 2014 for International Application No. PCT/US2014/041698.
Copending U.S. Appl. No. 14/505,191, filed Oct. 2, 2014, Jun Lu.
Copending U.S. Appl. No. 14/505,247, filed Oct. 2, 2014, Jun Lu.
Copending U.S. Appl. No. 14/514,641, filed Oct. 15, 2014, Jun Lu.
Copending U.S. Appl. No. 14/563,352, filed Dec. 8, 2014, Zhou Li, et al.
Copending U.S. Appl. No. 14/563,359, filed Dec. 8, 2014, Jun Lu, et al.
Copending U.S. Appl. No. 14/563,364, filed Dec. 8, 2014, Jun Lu, et al.
Copending U.S. Appl. No. 14/563,372, filed Dec. 8, 2014, Jun Lu, et al.
Copending U.S. Appl. No. 14/563,373, filed Dec. 8, 2014, Jun Lu, et al.
Copending U.S. Appl. No. 14/563,622, filed Dec. 8, 2014, Jun Lu, et al.
Copending U.S. Appl. No. 14/563,719, filed Dec. 8, 2014, Jun Lu, et al.
Copending U.S. Appl. No. 14/563,011, filed Dec. 8, 2014, Jun Lu.
Copending U.S. Appl. No. 14/563,381, filed Dec. 8, 2014, Jun Lu, et al.
PCT International Search Report and Written Opinion dated Jan. 22, 2015 for International Application No. PCT/US2014/041689.
Office Action dated Apr. 6, 2015 received in co-pending U.S. Appl. No. 14/300,612.
Office Action dated Apr. 15, 2015 received in co-pending U.S. Appl. No. 14/299,996.
Sigma-Aldrich®. "Poly(3-methyl-1,5-pentanediol Adipate)," Retrieved Apr. 11 2016, p. 1.
Sigma-Aldrich "Di(propylene glycol) dibenzoate" retrieved Jul. 1, 2016, 3 pages.
Office Action dated Dec. 3, 2015 received in co-pending U.S. Appl. No. 14/299,945.
USPTO Notice of Allowance dated Nov. 20, 2015 for copending U.S. Appl. No. 14/300,612.
Copending U.S. Appl. No. 14/973,547, filed Dec. 17, 2015, Jun Lu.; now U. S. Publication No. 2016/0102181.
Office Action dated Nov. 30, 2015 received in co-pending U.S. Appl. No. 14/299,975.
Copending U.S. Appl. No. 14/973,500, filed Dec. 17, 2015, Lu et al.; now U. S. Publication No. 2016/0101605.
Co-pending U.S. Appl. No. 14/563,347, filed Dec. 8, 2014;Jun Lu and Yalda Farhoudi; now U. S. Publication No. 2016-0160025.
Office Action dated Jan. 21, 2016 received in co-pending U.S. Appl. No. 14/563,347.
Office Action dated May 2, 2016 received in co-pending U.S. Appl. No. 14/563,347.
Office Action dated Nov. 6, 2015 received in co-pending U.S. Appl. No. 14/563,372.
Office Action dated Mar. 22, 2016 received in co-pending U.S. Appl. No. 14/563,372.
USPTO Notice of Allowance dated Apr. 20, 2016 for copending U.S. Appl. No. 14/563,372.
USPTO Notice of Allowance dated Feb. 5, 2016 for copending U.S. Appl. No. 14/514,641.

(56) References Cited

OTHER PUBLICATIONS

Copending U.S. Appl. No. 15/051,222, filed Feb. 23, 2016, Jun Lu; now U. S. Publication No. 2016-0171961.
Office Action dated Jun. 15, 2016, 2016 received in co-pending U.S. Appl. No. 15/051,222.
Office Action dated Apr. 21, 2016 received in co-pending U.S. Appl. No. 14/505,191.
Office Action dated Dec. 31, 2015 received in co-pending U.S. Appl. No. 14/505,247.
Office Action dated Apr. 22, 2016 received in co-pending U.S. Appl. No. 14/505,247.
USPTO Notice of Allowance dated Nov. 24, 2015 for copending U.S. Appl. No. 14/299,996.
Copending U.S. Appl. No. 15/051,183, filed Feb. 23, 2016, Spangler et al.; now U. S. Publication No. 2016-0168353.
PCT International Search Report and Written Opinion dated Jan. 26, 2016 for International Application No. PCT/US2015/063907.
PCT International Search Report and Written Opinion dated May 23, 2016 for International Application No. PCT/US2015/063908.
PCT International Search Report and Written Opinion dated Jan. 26, 2016 for International Application No. PCT/US2015/063885.
PCT International Search Report and Written Opinion dated Jan. 7, 2016 for International Application No. PCT/US2015/055633.
PCT International Search Report and Written Opinion dated Nov. 19, 2015 for International Application No. PCT/US2015/051591.
PCT International Search Report and Written Opinion dated Nov. 19, 2015 for International Application No. PCT/US2015/051593.
PCT International Search Report and Written Opinion dated Apr. 18, 2016 for International Application No. PCT/US2015/063933.
PCT International Search Report and Written Opinion dated Mar. 29, 2016 for International Application No. PCT/US2015/063944.
PCT International Search Report and Written Opinion dated Jan. 26, 2016 for International Application No. PCT/US2015/063975.
Notification of Transmittal of the International Search Report and the Written Opinion of the International Searching Authority, or the Declaration dated Jul. 1, 2016 received in International Application No. PCT/US201/063900.
Office Communication notification dated Jul. 11, 2016 received in U.S. Appl. No. 14/587,702.
http://www.chemicalbook.com/ChemicalProductProperty EN CB0225180.htm; Jul. 2011.
Dupont, Untitled [discloses comparisons between PVB and SGP interlayers used in safety glass], accessed on Sep. 12, 2016, Dupont. com, obtained from http://www2.dupont.com/Building_Innovations/zh_CN/assets/downloads/SGPintro_E.pdf.
PubChem, Glutaraldehyde, accessed on Sep. 12, 2016, NIH.gov, obtained from https://pubchem.ncbi.nlm.nih.gov/compound/glotaraldehyde#section=Top.
Sigma-Aldrich, Tri(ethylene glycol) bis(2-ethylhexanoate), accessed on Sep. 12, 2016, Sigmaaldrich.com, obtained from http://www.sigmaaldrich.com/catalog/product/aldrich/525103?lang=en &region=US.
AzoM, Indium Tin Oxide (ITO)—Properties and Applications, Jan. 23, 2004, Azo Materials, obtained from http://www.azom.com/article.aspx?ArticleID=2349.
Office Action dated Oct. 4, 2016 received in co-pending U.S. Appl. No. 14/299,945.
Office Action dated Feb. 1, 2017 received in co-pending U.S. Appl. No. 14/973,547.
Notice of Allowance and Fee(s) due dated Mar. 21, 2017 received in co-pending U.S. Appl. No. 14/973,547.
Copending U.S. Appl. No. 15/474,105, filed Mar. 30, 2017, Jun Lu.
Copending U.S. Appl. No. 15/438,243, filed Feb. 21, 2017, Lu et al.
Co-pending U.S. Appl. No. 15/428,557, filed Feb. 9, 2017, Jun Lu and Yalda Farhoudi.
Co-pending U.S. Appl. No. 15/376,849, filed Dec. 13, 2016; Lu and Li; now U. S. Patent Publication No. 2017-0087813.
Co-pending U.S. Appl. No. 15/427,798, filed Feb. 8, 2017.
Copending U.S. Appl. No. 15/246,810, filed Aug. 25, 2016; Jun Lu et al.; now U. S. Patent Publication No. 2016-0361899.
Co-pending U.S. Appl. No. 15/427,844, filed Feb. 8, 2017; Lu and Li.
Office Action dated Mar. 9, 2017 received in co-pending U.S. Appl. No. 14/882,317.
Notice of Allowance and Fee(s) Due dated Aug. 12, 2016 received in co-pending U.S. Appl. No. 15/051,222.
Copending U.S. Appl. No. 15/248,502, filed Aug. 26, 2016; Jun Lu; now U.S. Pat. No. 9,576,568.
Office Action dated Nov. 21, 2016 received in co-pending U.S. Appl. No. 14/505,191.
Office Action dated Nov. 25, 2016 received in co-pending U.S. Appl. No. 14/505,247.
Office Action dated Mar. 9, 2017 received in co-pending U.S. Appl. No. 14/563,622.
Office Action dated Mar. 9, 2017 received in co-pending U.S. Appl. No. 14/563,719.
Office Action dated Sep. 16, 2016 received in co-pending U.S. Appl. No. 14/563,011.
Office Action dated Feb. 1, 2017 received in co-pending U.S. Appl. No. 14/587,702.
Reis, Joao Carlos R. et al.; "Refractive Index of Liquid Mixtures: Theory and Experiment"; ChemPhysChem; 2010; pp. 3722-3733.
"Uniplex 988 and Uniplex 988S" Technical Information: Lanxess Deutschland GmbH; 2012; pp. 2.
"BUTVAR polyvinyl butyral resin—Properties and uses" Technical Information; 2013; pp. 1-29.
parchem.com, cinnamaldehyde, 2017, obtain from www.parchem.com/cinnamaldehyde-getpdf-011158.aspx.
parchem.com, Dipropylene Glycol Dibenzoate, 2017, obtained from http://www.parchem.com/chemical-supplier-distributor/Dipropylene-Glycol-Dibenzoate-012292.aspx.
Examiner's Answer dated Jun. 27, 2017 received in co-pending U.S. Appl. No. 14/299,945.
Office Action dated Jul. 14, 2017 received in U.S. Appl. No. 14/563,359.
Office Action dated May 8, 2017 received in co-pending U.S. Appl. No. 14/505,191.
Office Action dated May 23, 2017 received in co-pending U.S. Appl. No. 14/563,011.
Office Action dated Apr. 28, 2017 received in co-pending U.S. Appl. No. 14/563,381.
Notification of Transmittal of the International Search Report and the Written Opinion of the International Searching Authority, or the Declaration dated May 9, 2017 received in International Application No. PCT/US2017/016898.

* cited by examiner

POLY(VINYL ACETAL) RESIN COMPOSITIONS, LAYERS, AND INTERLAYERS HAVING ENHANCED OPTICAL PROPERTIES

BACKGROUND

1. Field of the Invention

This disclosure relates to polymer resins and, in particular, to polymer resins suitable for use in polymer interlayers, including those utilized in multiple layer panels.

2. Description of Related Art

Poly(vinyl butyral) (PVB) is often used in the manufacture of polymer sheets that can be used as interlayers in multiple layer panels, including, for example, light-transmitting laminates such as safety glass or polymeric laminates. PVB is also used in photovoltaic solar panels to encapsulate the panels which are used to generate and supply electricity for commercial and residential applications.

Safety glass generally refers to a transparent laminate that includes at least one polymer sheet, or interlayer, disposed between two sheets of glass. Safety glass is often used as a transparent barrier in architectural and automotive applications, and one of its primary functions is to absorb energy resulting from impact or a blow without allowing penetration of the object through the glass and to keep the glass bonded even when the applied force is sufficient to break the glass. This prevents dispersion of sharp glass shards, which minimizes injury and damage to people or objects within an enclosed area. Safety glass may also provide other benefits, such as a reduction in ultraviolet (UV) and/or infrared (IR) radiation, and it may also enhance the aesthetic appearance of window openings through addition of color, texture, and the like. Additionally, safety glass with desirable acoustic properties has also been produced, which results in quieter internal spaces.

Often, polymers that exhibit one set of desirable properties, such as acoustic performance, lack other desirable properties, such as impact resistance or strength. Therefore, in order to achieve desirable combinations of properties, multilayered polymer interlayers have been used. These multilayered interlayers may include at least one inner "core" layer sandwiched between two outer "skin" layers. Often, the core layer of an interlayer may be a softer layer having a lower glass transition temperature, which enhances its acoustic performance. However, because such resin layers can be difficult to easily process and/or transport, the skin layers of such multilayered interlayers are often stiffer, with higher glass transition temperatures, which imparts enhanced processability, strength, and impact resistance to the interlayer.

However, use of various layers having different properties can also produce optical defects within the interlayer. For example, one defect common to these types of multilayer interlayers is mottle. Mottle is an objectionable form of optical distortion or visual defect appearing as uneven spots or texture, usually in the final structure. Mottle is caused by small-scale surface variations at the interfaces between the soft and stiff layers wherein the individual layers have different refractive indices. Clarity is another important optical property that is determined by measuring the level of haze within the interlayer or panel. High haze typically occurs when different types of optically incompatible polymers and/or plasticizers are blended or mixed together. In such mixtures, light passing through the blend is scattered as it encounters regions of different polymer materials, and the result is a hazy, visually unclear appearance. High clarity polymers and interlayers are those having very low haze values.

Thus, a need exists for polymer resins, resin layers, and interlayers that exhibit desirable optical properties, such as reduced haze and mottle and improved clarity, without sacrificing other properties, including impact resistance and acoustic performance. Such interlayers could be monolithic or multilayered and should be usable in a wide variety of applications, including safety glass and polymer laminates.

SUMMARY

One embodiment of the present invention concerns an interlayer comprising: a resin layer comprising a poly(vinyl acetal) resin, a plasticizer, and at least one solid RI additive having a refractive index of at least 1.460, wherein the solid RI additive is present in the resin layer in an amount of at least 1 part per hundred parts of resin (phr).

Another embodiment of the present invention concerns an interlayer comprising a first resin layer comprising a first poly(vinyl acetal) resin and a first plasticizer; a second resin layer adjacent to the first resin layer, wherein the second resin layer comprises a second poly(vinyl acetal) resin and a second plasticizer, wherein the second resin layer has a glass transition temperature that is at least 3° C. higher or lower than the glass transition temperature of the first resin layer; and a solid refractive index (RI) additive present in at least one of the first and the second resin layers, wherein the solid RI additive is present in the at least one of the first and the second resin layers in an amount such that the absolute value of the difference between the refractive index of the first resin layer and the refractive index of the second resin layer is not more than 0.010.

Yet another embodiment of the present invention concerns a method of making an interlayer, the method comprising the steps of blending a first poly(vinyl acetal) resin with a first plasticizer to form a first plasticized resin; blending a second poly(vinyl acetal) resin with a second plasticizer to form a second plasticized resin; and forming an interlayer comprising a first resin layer and a second resin layer adjacent to the first resin layer, wherein the first resin layer comprises the first plasticized resin and the second resin layer comprises the second plasticized resin, wherein at least one of the blending of step (a) and the blending of step (b) further comprises blending the first and/or the second poly(vinyl acetal) resin with at least one solid refractive index (RI) additive, and wherein the absolute value of the difference between the refractive index of the first resin layer and the refractive index of the second resin layer in the interlayer is not more than 0.010.

DETAILED DESCRIPTION

Resin compositions, layers, and interlayers according to various embodiments of the present invention can comprise one or more thermoplastic polymers and a refractive index (RI) balancing agent. As used herein, the term "refractive index balancing agent" or "RI balancing agent" refers to any component or additive included in the composition, layer, or interlayer for adjusting the refractive index of at least one of the resins or layers. The RI balancing agent may increase or reduce the refractive index of at least one of the resins or layers within an interlayer, which may improve the optical properties of the interlayer, including mottle, haze, and/or clarity, as compared to an identical interlayer formed without an RI balancing agent.

As used herein, the terms "polymer resin composition" and "resin composition" refer to compositions including one or more polymer resins. Polymer compositions may optionally include other components, such as plasticizers and/or other additives. As used herein, the terms "polymer resin layer" and "resin layer" refer to one or more polymer resins, optionally combined with one or more plasticizers, that have been formed into a polymeric sheet. Again, resin layers can include additional additives, although these are not required. As used herein, the term "interlayer" refers to a single or multiple layer polymer sheet suitable for use with at least one rigid substrate to form a multiple layer panel. The terms "single-sheet" interlayer and "monolithic" interlayer refer to interlayers formed of one single resin sheet, while the terms "multiple layer" and "multilayer" interlayer refer to interlayers having two or more resin sheets coextruded, laminated, or otherwise coupled to one another.

The resin compositions, layers, and interlayers described herein may include one or more thermoplastic polymers. Examples of suitable thermoplastic polymers can include, but are not limited to, poly(vinyl acetal) resins, polyurethanes (PU), poly(ethylene-co-vinyl) acetates (EVA), polyvinyl chlorides (PVC), poly(vinylchloride-co-methacrylate), polyethylenes, polyolefins, ethylene acrylate ester copolymers, poly(ethylene-co-butyl acrylate), silicone elastomers, epoxy resins, and acid copolymers such as ethylene/carboxylic acid copoloymers and ionomers thereof, derived from any of the previously-listed polymers, and combinations thereof. In some embodiments, the thermoplastic polymer can be selected from the group consisting of poly(vinyl acetal) resins, polyvinyl chloride, and polyurethanes, or the resin can comprise one or more poly(vinyl acetal) resins. Although described herein with respect to poly(vinyl acetal) resins, it should be understood that one or more of the above polymer resins could be included with, or in the place of, the poly(vinyl acetal) resins described below in accordance with various embodiments of the present invention.

When the resin compositions, layers, and interlayers described herein include poly(vinyl acetal) resins, the poly (vinyl acetal) resins can be formed according to any suitable method. Poly(vinyl acetal) resins can be formed by acetalization of polyvinyl alcohol with one or more aldehydes in the presence of an acid catalyst. The resulting resin can then be separated, stabilized, and dried according to known methods such as, for example, those described in U.S. Pat. Nos. 2,282,057 and 2,282,026, as well as "Vinyl Acetal Polymers," in the *Encyclopedia of Polymer Science & Technology*, $3^{rd}$ ed., Volume 8, pages 381-399, by B. E. Wade (2003). The resulting poly(vinyl acetal) resins may have a total percent acetalization of at least about 50, at least about 60, at least about 70, at least about 75, at least about 80, at least about 85 weight percent, measured according to ASTM D-1396, unless otherwise noted. The total amount of aldehyde residues in a poly(vinyl acetal) resin can be collectively referred to as the acetal component, with the balance of the poly(vinyl acetal) resin being residual hydroxyl and residual acetate groups, which will be discussed in further detail below.

According to some embodiments, the resin composition, layer, or interlayer may include at least one poly(vinyl acetal) resin, which may be present in the composition, layer, or interlayer in an amount of at least about 0.5, at least about 1, at least about 2, at least about 3, at least about 5, at least about 10, at least about 15, at least about 20, at least about 30, at least about 40, or at least about 45 weight percent, based on the combined weight of all resins in the composition, layer, or interlayer. Together, the at least one poly(vinyl acetal) resins can make up at least about 10, at least about 20, at least about 30, at least about 40, at least about 50, at least about 60, at least about 70, or at least about 80 weight percent of composition, layer, or interlayer, based on the combined weight of all resins. In some embodiments, the amount of resins other than the at least one poly(vinyl acetal) resin can be not more than about 20, not more than about 15, not more than about 10, not more than about 5, not more than about 2, or not more than about 1 weight percent, based on the combined weight of all resins.

In some embodiments, the resin composition, layer, or interlayer can include at least a first poly(vinyl acetal) resin and a second poly(vinyl acetal) resin, each of which may be present in the composition, layer, or interlayer in an amount of at least about 0.5, at least about 1, at least about 2, at least about 3, at least about 5, at least about 10, at least about 15, at least about 20, at least about 30, at least about 40, or at least about 45 weight percent, based on the combined weight of all resins in the composition, layer, or interlayer. Together, the first and second poly(vinyl acetal) resins can make up at least about 10, at least about 20, at least about 30, at least about 40, at least about 50, at least about 60, at least about 70, or at least about 80 weight percent of composition, layer, or interlayer, based on the combined weight of all resins. In some embodiments, the amount of resins other than the first and second poly(vinyl acetal) resins can be not more than about 20, not more than about 15, not more than about 10, not more than about 5, not more than about 2, or not more than about 1 weight percent, based on the combined weight of all resins.

In some embodiments, one of the first and the second poly(vinyl acetal) resins can be present in the composition, layer, or interlayer in an amount of less than 12 weight percent, based on the combined weight of the first and second poly(vinyl acetal) resins. For example, the first or the second poly(vinyl acetal) resin can be present in the composition, layer, or interlayer in an amount of at least about 0.5, at least about 1, at least about 1.5, at least about 2, at least about 2.5, at least about 3, at least about 3.5, at least about 4, at least about 4.5, at least about 5, at least about 5.5, at least about 6, at least about 6.5, at least about 7 weight percent and/or not more than about 12, not more than about 11.5, not more than about 11, not more than about 10.5, not more than about 10, not more than about 9.5, not more than about 9, not more than about 8.5, not more than about 8, not more than about 7.5 weight percent, based on the combined weight of the first and second poly(vinyl acetal) resins. In some embodiments, one of the first and second poly(vinyl acetal) resins can be present in the composition, layer, or interlayer in an amount in the range of from about 0.5 to about 12, about 1.5 to about 11.5, about 2 to about 11, about 2.5 to about 10 weight percent, based on the combined weight of the first and second poly(vinyl acetal) resins.

The first and second poly(vinyl acetal) resins can include residues of any suitable aldehyde and, in some embodiments, can include residues of at least one $C_1$ to $C_{10}$ aldehyde, at least one $C_4$ to $C_8$ aldehyde. Examples of suitable $C_4$ to $C_8$ aldehydes can include, but are not limited to, n-butyraldehyde, iso-butyraldehyde, 2-methylvaleraldehyde, n-hexyl aldehyde, 2-ethylhexyl aldehyde, n-octyl aldehyde, and combinations thereof. At least one of the first and second poly(vinyl acetal) resins can include at least about 20, at least about 30, at least about 40, at least about 50, at least about 60, or at least about 70 weight percent of residues of at least one $C_4$ to $C_8$ aldehyde, based on the total weight of aldehyde residues of the resin, and/or can include not more than about 90, not more than about 85, not more than about 80, not more than about 75, not more than about 70, or not more than about 65 weight percent of at least one $C_4$ to $C_8$ aldehyde, or in the range of from about 20 to about 90, about 30 to about 80, or about 40 to about 70 weight percent of at least one $C_4$ to $C_8$ aldehyde. The $C_4$ to $C_8$ aldehyde may be selected from the group listed above, or it can be selected from the group consisting of n-butyraldehyde, iso-butyraldehyde, 2-ethylhexyl aldehyde, and combinations thereof.

In various embodiments, the first and/or second poly (vinyl acetal) resin may be a polyvinyl n-butyral (PVB) resin. In other embodiments, the first and/or second poly (vinyl acetal) resin can be a poly(vinyl n-butyral) resin that mainly comprises residues of n-butyraldehyde, and may, for example, include not more than about 50, not more than about 40, not more than about 30, not more than about 20, not more than about 10, not more than about 5, or not more than about 2 weight percent of residues of an aldehyde other than n-butyraldehyde, based on the total weight of all aldehyde residues of the resin. When the first and/or second poly(vinyl acetal) resins are PVB resins, the molecular weight of the resins can be at least about 50,000, at least about 70,000, at least about 100,000 Daltons and/or not more than about 600,000, not more than about 550,000, not more than about 500,000, not more than about 450,000, or not more than 425,000 Daltons, measured by size exclusion chromatography using low angle laser light scattering (SEC/LALLS) method of Cotts and Ouano. As used herein, the term "molecular weight" refers to weight average molecular weight ($M_w$). The molecular weight of the first and/or second poly(vinyl acetal) resin can be in the range of from about 50,000 to about 600,000, about 70,000 to about 450,000, or about 100,000 to about 425,000 Daltons.

Although generally described herein with respect to first and second poly(vinyl acetal) resins, it should be understood that, in some embodiments, an equivalent single poly(vinyl acetal) resin including first and second acetal moieties may be substituted for the first and second poly(vinyl acetal) resins with similar results. As used herein, the term "poly (vinyl acetal) resin component" can refer to an individual poly(vinyl acetal) resin present in a blend of resins or to an acetal moiety present on a single poly(vinyl acetal) resin. In various embodiments, the ratio, by weight, of the amount of the first poly(vinyl acetal) resin component to the second poly(vinyl acetal) resin component in a layer, interlayer, or blend can be in the range of from about 0.5:99.5 to about 99.5:0.5, about 1:99 to 99:1, about 10:90 to about 90:10, about 25:75 to about 75:25, or about 40:60 to about 60:40.

In some embodiments, at least one resin composition, layer, or interlayer can include at least a first poly(vinyl acetal) resin component and a second poly(vinyl acetal) resin component. In some embodiments, the first and second resin components may comprise first and second poly(vinyl acetal) resins that can be physically mixed to form a resin blend, which may be combined with one or more plasticizers or other additives to provide a blended resin layer or interlayer. In other embodiments, the first and second poly (vinyl acetal) resin components may be present as respective first and second acetal moieties in a single poly(vinyl acetal) resin. As with the resin blend, this single "hybrid" poly(vinyl acetal) resin can be optionally blended with a plasticizer and utilized in resin layers and interlayers.

In some embodiments, when the resin components include poly(vinyl acetal) resins, the first and second poly (vinyl acetal) resins may be blended such that one of the first and second resins is dispersed within the other of the first and second resins, which can form domains of one of the first and second poly(vinyl acetal) resins within the other of the first and second poly(vinyl acetal) resins. Such a blended resin may be used as a single layer interlayer or it may be combined with one or more adjacent layers to form a multilayer interlayer. In other embodiments, the first and second poly(vinyl acetal) resins can be present in adjacent layers of a multilayer interlayer, such that one of the layers of the interlayer includes the first poly(vinyl acetal) resin and another layer of the interlayer includes the second poly(vinyl acetal) resin. Additional layers can also be present adjacent to at least one of the layers.

The resin compositions, layers, and interlayers according to various embodiments of the present invention can further include at least one plasticizer. Depending on the specific composition of the resin or resins in a composition, layer, or interlayer, the plasticizer may be present in an amount of at least about 5, at least about 10, at least about 15, at least about 20, at least about 25, at least about 30, at least about 35, at least about 40, at least about 45, at least about 50, at least about 55, at least about 60 parts per hundred parts of resin (phr) and/or not more than about 120, not more than about 110, not more than about 105, not more than about 100, not more than about 95, not more than about 90, not more than about 85, not more than about 75, not more than about 70, not more than about 65, not more than about 60, not more than about 55, not more than about 50, not more than about 45, or not more than about 40 phr, or in the range of from about 5 to about 120, about 10 to about 110, about 20 to about 90, or about 25 to about 75 phr. Specific embodiments are discussed in detail shortly.

As used herein, the term "parts per hundred parts of resin" or "phr" refers to the amount of plasticizer present as compared to one hundred parts of resin, on a weight basis. For example, if 30 grams of plasticizer were added to 100 grams of a resin, the plasticizer would be present in an amount of 30 phr. If the resin composition, layer, or interlayer includes two or more resins, the weight of plasticizer is compared to the combined amount of all resins present to determine the parts per hundred resin. Further, when the plasticizer content of a layer or interlayer is provided herein, it is provided with reference to the amount of plasticizer in the mix or melt that was used to produce the layer or interlayer.

Examples of suitable plasticizers can include, but are not limited to, triethylene glycol di-(2-ethylhexanoate) ("3GEH"), triethylene glycol di-(2-ethylbutyrate), triethylene glycol diheptanoate, tetraethylene glycol diheptanoate, tetraethylene glycol di-(2-ethylhexanoate) ("4GEH"), dihexyl adipate, dioctyl adipate, hexyl cyclohexyladipate, diisononyl adipate, heptylnonyl adipate, di(butoxyethyl) adipate, and bis(2-(2-butoxyethoxy)ethyl) adipate, dibutyl sebacate, dioctyl sebacate, and mixtures thereof. The plasticizer may be selected from the group consisting of triethylene glycol di-(2-ethylhexanoate) and tetraethylene glycol di-(2-ethylhexanoate), or the plasticizer can comprise triethylene glycol di-(2-ethylhexanoate).

According to some embodiments, the first and second poly(vinyl acetal) resins in the compositions, layers, and interlayers described herein can have different compositions. For example, in some embodiments, the first poly(vinyl acetal) resin can have a residual hydroxyl content and/or residual acetate content that is at least about 2, at least about 3, at least about 4, at least about 5, at least about 6, or at least about 8 weight percent higher or lower than the residual hydroxyl content and/or residual acetate content of the second poly(vinyl acetal) resin. As used herein, the terms "residual hydroxyl content" and "residual acetate content"

refer to the amount of hydroxyl and acetate groups, respectively, that remain on a resin after processing is complete. For example, polyvinyl n-butyral can be produced by hydrolyzing polyvinyl acetate to polyvinyl alcohol, and then acetalizing the polyvinyl alcohol with n-butyraldehyde to form polyvinyl n-butyral. In the process of hydrolyzing the polyvinyl acetate, not all of the acetate groups are converted to hydroxyl groups, and residual acetate groups remain on the resin. Similarly, in the process of acetalizing the polyvinyl alcohol, not all of the hydroxyl groups are converted to acetal groups, which also leaves residual hydroxyl groups on the resin. As a result, most poly(vinyl acetal) resins include both residual hydroxyl groups (as vinyl hydroxyl groups) and residual acetate groups (as vinyl acetate groups) as part of the polymer chain. The residual hydroxyl content and residual acetate content are expressed in weight percent, based on the weight of the polymer resin, and are measured according to ASTM D-1396, unless otherwise noted.

The difference between the residual hydroxyl content of the first and second poly(vinyl acetal) resins could also be at least about 2, at least about 5, at least about 10, at least about 12, at least about 15, at least about 20, or at least about 30 weight percent. As used herein, the term "weight percent different" or "the difference . . . is at least . . . weight percent" refers to a difference between two given weight percentages, calculated by subtracting the one number from the other. For example, a poly(vinyl acetal) resin having a residual hydroxyl content of 12 weight percent has a residual hydroxyl content that is 2 weight percent lower than a poly(vinyl acetal) resin having a residual hydroxyl content of 14 weight percent (14 weight percent–12 weight percent=2 weight percent). As used herein, the term "different" can refer to a value that is higher than or lower than another value.

At least one of the first and second poly(vinyl acetal) resins can have a residual hydroxyl content of at least about 14, at least about 14.5, at least about 15, at least about 15.5, at least about 16, at least about 16.5, at least about 17, at least about 17.5, at least about 18, at least about 18.5, at least about 19, at least about 19.5 and/or not more than about 45, not more than about 40, not more than about 35, not more than about 33, not more than about 30, not more than about 27, not more than about 25, not more than about 22, not more than about 21.5, not more than about 21, not more than about 20.5, or not more than about 20 weight percent, or in the range of from about 14 to about 45, about 16 to about 30, about 18 to about 25, about 18.5 to about 20, or about 19.5 to about 21 weight percent.

The other poly(vinyl acetal) resin can have a residual hydroxyl content of at least about 8, at least about 9, at least about 10, at least about 11 weight percent and/or not more than about 16, not more than about 15, not more than about 14.5, not more than about 13, not more than about 11.5, not more than about 11, not more than about 10.5, not more than about 10, not more than about 9.5, or not more than about 9 weight percent, or in the range of from about 8 to about 16, about 9 to about 15, or about 9.5 to about 14.5 weight percent, and can be selected such that the difference between the residual hydroxyl content of the first and second poly(vinyl acetal) resin is at least about 2 weight percent, as mentioned previously. One or more other poly(vinyl acetal) resins may also be present in the resin composition, layer, or interlayer and can have a residual hydroxyl within the ranges provided above. Additionally, the residual hydroxyl content of the one or more other poly(vinyl acetal) resins can be the same as or different than the residual hydroxyl content of the first and/or second poly(vinyl acetal) resins.

In some embodiments, at least one of the first and second poly(vinyl acetal) resins can have a residual acetate content different than the other. For example, in some embodiments, the difference between the residual acetate content of the first and second poly(vinyl acetal) resins can be at least about 2, at least about 3, at least about 4, at least about 5, at least about 8, at least about 10 weight percent. One of the poly(vinyl acetal) resins may have a residual acetate content of not more than about 4, not more than about 3, not more than about 2, or not more than about 1 weight percent, measured as described above. In some embodiments, at least one of the first and second poly(vinyl acetal) resins can have a residual acetate content of at least about 5, at least about 8, at least about 10, at least about 12, at least about 14, at least about 16, at least about 18, at least about 20, or at least about 30 weight percent. The difference in the residual acetate content between the first and second poly(vinyl acetal) resins can be within the ranges provided above, or the difference can be less than about 3, not more than about 2, not more than about 1, or not more than about 0.5 weight percent. Additional poly(vinyl acetal) resins present in the resin composition or interlayer can have a residual acetate content the same as or different than the residual acetate content of the first and/or second poly(vinyl acetal) resin.

In some embodiments, the difference between the residual hydroxyl content of the first and second poly(vinyl acetal) resins can be less than about 2, not more than about 1, not more than about 0.5 weight percent and the difference in the residual acetate content between the first and second poly (vinyl acetal) resins can be at least about 3, at least about 5, at least about 8, at least about 15, at least about 20, or at least about 30 weight percent. In other embodiments, the difference in the residual acetate content of the first and second poly(vinyl acetal) resins can be less than about 3, not more than about 2, not more than about 1, or not more than about 0.5 weight percent and the difference in the residual hydroxyl content of the first and second poly(vinyl acetal) resins can be at least about 2, at least about 5, at least about 10, at least about 12, at least about 15, at least about 20, or at least about 30 weight percent.

In various embodiments, the differences in residual hydroxyl and/or residual acetate content of the first and second poly(vinyl acetal) resins can be selected to control or provide certain performance properties, such as strength, impact resistance, penetration resistance, processability, or acoustic performance to the final composition, layer, or interlayer. For example, poly(vinyl acetal) resins having a higher residual hydroxyl content, usually greater than about 16 weight percent, can facilitate high impact resistance, penetration resistance, and strength to a resin composition or layer, while lower hydroxyl content resins, usually having a residual hydroxyl content of less than 16 weight percent, can improve the acoustic performance of the interlayer or blend.

Poly(vinyl acetal) resins having higher or lower residual hydroxyl contents and/or residual acetate contents may also, when combined with at least one plasticizer, ultimately include different amounts of plasticizer. As a result, layers or domains formed of first and second poly(vinyl acetal) resins having different compositions may also have different properties within a single resin layer or interlayer. Although not wishing to be bound by theory, it is assumed that the compatibility of a given plasticizer with a poly(vinyl acetal) resin can depend, at least in part, on the composition of the polymer, and, in particular, on its residual hydroxyl content. Overall, poly(vinyl acetal) resins with higher residual hydroxyl contents tend to exhibit a lower compatibility (or capacity) for a given plasticizer as compared to similar resins having a lower residual hydroxyl content. As a result, poly(vinyl acetal) resins with higher residual hydroxyl contents tend to be less plasticized and exhibit higher stiffness than similar resins having lower residual hydroxyl contents. Conversely, poly(vinyl acetal) resins having lower residual hydroxyl contents may tend to, when plasticized with a given plasticizer, incorporate higher amounts of plasticizer, which may result in a softer resin layer that exhibits a lower glass transition temperature than a similar resin having a higher residual hydroxyl content. Depending on the specific resin and plasticizer, these trends could be reversed.

When two poly(vinyl acetal) resins having different levels of residual hydroxyl content are blended with a plasticizer, the plasticizer may partition between the resin layers or domains, such that more plasticizer can be present in the layer or domain having the lower residual hydroxyl content and less plasticizer may be present in the layer or domain having the higher residual hydroxyl content. Ultimately, a state of equilibrium is achieved between the two resins. The correlation between the residual hydroxyl content of a poly(vinyl acetal) resin and plasticizer compatibility/capacity can facilitate addition of a proper amount of plasticizer to the polymer resin. Such a correlation also helps to stably maintain the difference in plasticizer content between two or more resins when the plasticizer would otherwise migrate between the resins.

In some embodiments, a resin layer or interlayer can include at least a first resin layer comprising a first poly(vinyl acetal) resin and a first plasticizer, and a second resin layer, adjacent to the first resin layer, comprising a second poly(vinyl acetal) resin and a second plasticizer. The first and second plasticizer can be the same type of plasticizer, or the first and second plasticizers may be different. In some embodiments, at least one of the first and second plasticizers may also be a blend of two or more plasticizers, which can be the same as or different than one or more other plasticizers. When one of the first and second poly(vinyl acetal) resins has a residual hydroxyl content that is at least 2 weight percent higher or lower than the residual hydroxyl content of the other, the difference in plasticizer content between the resin layers can be at least about 2, at least about 5, at least about 8, at least about 10, at least about 12, or at least about 15 phr. In most embodiments, the resin layer that includes the resin having a lower hydroxyl content can have the higher plasticizer content. In order to control or retain other properties of the resin layer or interlayer, the difference in plasticizer content between the first and second resin layers may be not more than about 40, not more than about 30, not more than about 25, not more than about 20, or not more than about 17 phr. In other embodiments, the difference in plasticizer content between the first and second resin layers can be at least about 40, at least about 50, at least about 60, or at least about 70 phr.

As a result, in some embodiments, wherein the first and second poly(vinyl acetal) resins are present in adjacent layers of a multilayer interlayer, the first and second resin layers can exhibit different glass transition temperatures. Similarly, when the first and second poly(vinyl acetal) resins are present in a blend, the domains of one of the first and second poly(vinyl acetal) resins can exhibit a different glass transition temperature than the other of the first and second poly(vinyl acetal) resins. Glass transition temperature, or $T_g$, is the temperature that marks the transition from the glass state of the polymer to the rubbery state. The glass transition temperatures of the resins and layers described herein were determined by dynamic mechanical thermal analysis (DTMA). The DTMA measures the storage (elastic) modulus (G') in Pascals, loss (viscous) modulus (G") in Pascals, and the tan delta (G"/G') of the specimen as a function of temperature at a given oscillation frequency and temperature sweep rate. The glass transition temperature is then determined by the position of the tan delta peak on the temperature scale. Glass transition temperatures provided herein were determined at an oscillation frequency of 1 Hz under shear mode and a temperature sweep rate of 3° C./min.

The difference in the glass transition temperature of the first resin layer and the second resin layer, or between various regions of a blended resin or resin layer, can be at least about 3, at least about 5, at least about 8, at least about 10, at least about 12, at least about 15, at least about 18, at least about 20, at least about 22, or at least about 25° C. One of the first and second resin layers can have a glass transition temperature of at least about 26, at least about 28, at least about 30, at least about 33, at least about 35° C. and/or not more than about 70, not more than about 65, not more than about 60, not more than about 55, not more than about 50° C., or in the range of from about 26 to about 70, about 30 to about 60, about 35 to about 50° C. The other of the first and second poly(vinyl acetal) resins can have a glass transition temperature of not more than 25, not more than about 20, not more than about 15, not more than about 10, not more than about 5, not more than about 0, not more than about −5, or not more than about −10° C.

When the first and second poly(vinyl acetal) resins are blended with one another such that domains of one resin are dispersed within the other, such differences in plasticizer content and/or glass transition temperature may also exist between domains of the first and second resins. For example, in some embodiments, a resin layer or interlayer may include various domains of higher or lower plasticizer content and/or domains having higher or lower glass transition temperatures, as described previously. In some embodiments, at least a portion of the resin layer or interlayer can have a glass transition temperature of at least about 26, at least about 28, at least about 30, at least about 33, at least about 35° C. and/or not more than about 70, not more than about 65, not more than about 60, not more than about 55, not more than about 50° C., or in the range of from about 26 to about 70, about 28 to about 60, about 35 to about 50° C. and/or at least a portion of the resin layer or interlayer can have a glass transition temperature of not more than 25, not more than about 20, not more than about 15, not more than about 10, not more than about 5, not more than about 0° C., not more than about −5° C., or not more than about −10° C.

One or more resin blends, layers, and interlayers described herein may include various other additives to impart particular properties or features to the interlayer. Such additives can include, but are not limited to, dyes, pigments, stabilizers such as ultraviolet stabilizers, antioxidants, anti-blocking agents, flame retardants, IR absorbers or blockers such as indium tin oxide, antimony tin oxide, lanthanum hexaboride ($LaB_6$) and cesium tungsten oxide, processing aides, flow enhancing additives, lubricants, impact modifiers, nucleating agents, thermal stabilizers, UV absorbers, dispersants, surfactants, chelating agents, coupling agents, adhesives, primers, reinforcement additives, and fillers.

Additionally, various adhesion control agents ("ACAs") can be used in the interlayers of the present disclosure to control the adhesion of the sheet to glass. In various embodiments, the amount of ACAs present in a resin composition, layer, or interlayer can be at least about 0.003, at least about 0.01, at least about 0.025 and/or not more than about 0.15, not more than about 0.10, or not more than about 0.04 phr, or in the range of from about 0.003 to about 0.15, about 0.01 to about 0.10, or about 0.025 to about 0.04 phr. Suitable ACAs can include, but are not limited to, sodium acetate, potassium acetate, magnesium bis(2-ethyl butyrate), magnesium bis(2-ethylhexanoate), and combinations thereof, as well as the ACAs disclosed in U.S. Pat. No. 5,728,472.

Resins having different compositions and plasticized resin layers having different properties also tend to exhibit different refractive indices, which can reduce the optical quality of the resulting layer or blend. Although not wishing to be bound by theory, it is believed that such differences in refractive index may cause light that passes through the different resin layers or domains to be refracted in different directions, which may cause haze in the final product. At times, the absolute value of the difference between the refractive index of the first poly(vinyl acetal) resin or layer and the refractive index of the second poly(vinyl acetal) resin or layer, measured according to ASTM D542 at a wavelength of 589 nm and 25° C., can exceed 0.010. As a result, these compositions, layers, or interlayers can have a haze value greater than 5 percent and/or a mottle value greater than 3.

However, in various embodiments of the present invention, compositions, layers, and interlayers comprising a poly(vinyl acetal) resin may further include at least one refractive index (RI) balancing agent for adjusting the refractive index of the composition, layer, or interlayer. In some embodiments, the composition, layer, or interlayer may include at least a first poly(vinyl acetal) resin and a second poly(vinyl acetal) resin along with at least one RI balancing agent. In other embodiments, the composition, layer, or interlayer ma include a single poly(vinyl acetal) resin along with at least one RI balancing agent. As discussed above, the RI balancing agent can be any suitable agent present in a resin or a resin blend, layer, or interlayer, or portion thereof, that increases or reduces the refractive index of at least one resin or layer, which may improve the optical properties of the interlayer as compared to an identical interlayer formed without an RI balancing agent. In some embodiments, the resin blend, layer, or interlayer may have a haze value of at least 5 percent when formed in the absence of the RI balancing agent.

The RI balancing agent can be in any suitable form and may be physically blended with one or more resins or it can be chemically bonded, or reacted, with at least one resin so that the RI balancing agent is incorporated into the polymer chain. Examples of RI balancing agents can include, but are not limited to, liquid RI additives, solid RI additives, and residues of at least one aldehyde present in one or more of the poly(vinyl acetal) resins. Various embodiments of RI balancing agents, as well as resin compositions, layers, and interlayers including the same, will now be discussed in detail below.

The RI balancing agent may be present in the resin, resin layer, or interlayer in an amount sufficient to modify the refractive index of poly(vinyl acetal) resin, resin layer, or interlayer. The RI balancing agent may also be present in the composition, layer, or interlayer in an amount sufficient to modify the refractive index of at least one of the two poly(vinyl acetal) resins, thereby minimizing the difference between the refractive indices of two poly(vinyl acetal) resin layers having different refractive indices. The RI balancing agent may also minimize the difference between the refractive index of one or more poly(vinyl acetal) resins and one or more plasticizers within a resin composition, layer, or interlayer. In some embodiments, the RI balancing agent may be present in an amount sufficient to reduce the absolute value of the difference between the refractive index the first poly(vinyl acetal) resin layer and the refractive index of the second poly(vinyl acetal) resin layer to not more than 0.010, not more than about 0.009, not more than about 0.008, not more than about 0.007, not more than about 0.006, not more than about 0.005, not more than about 0.004, or not more than about 0.003. When a multilayer interlayer includes two or more resin layers, the RI balancing agent may be present in one or both layers and can, in some embodiments, be present in one of the layers in a higher amount than in one or more of the other layers.

In some embodiments, the RI balancing agent can comprise one or more residues of an aldehyde having a refractive index of at least 1.421, as measured by ASTM D542 at a wavelength of 589 nm and a temperature of 25° C. The RI balancing aldehyde, which may also be referred to herein as a "high refractive index aldehyde" or "high RI aldehyde," can have a refractive index of at least about 1.425, at least about 1.450, at least about 1.475, at least about 1.500, at least about 1.510, or at least about 1.515 and/or not more than about 1.675, not more than about 1.650, or not more than about 1.625, or in the range of from about 1.425 to about 1.675, about 1.475 to about 1.650, or about 1.515 to about 1.625. The high RI aldehyde may be an aromatic aldehyde that includes at least one aromatic ring or group. Examples of aromatic aldehydes can include, but are not limited to, $C_7$ to $C_{30}$ aromatic aldehydes, $C_8$ to $C_{25}$ aromatic aldehydes, or $C_9$ to $C_{20}$ aromatic aldehydes. Specific examples of high RI aldehydes that can be used as RI balancing agents in various embodiments of the present invention are listed in Table 1, below.

TABLE 1

Exemplary High RI Aldehydes

| Aldehyde | Refractive Index |
| --- | --- |
| Hexylcinnamaldehyde | 1.517 |
| Benzaldeyde | 1.545 |
| Cinnamaldehyde | 1.620 |
| 4-Chlorobenzaldehyde | 1.585 |
| 4-t-butylphenylacetaldehyde | 1.530 |
| 2-phenylpropionaldehyde | 1.517 |
| Hydrocinnamaldehyde | 1.523 |

When the RI balancing agent includes residues of at least one high RI aldehyde, at least one of the first and second poly(vinyl acetal) resins can include residues of at least one high RI aldehyde in an amount of at least about 0.5, at least about 1, at least about 5, at least about 10, at least about 15, at least about 20, at least about 25, at least about 30, at least about 35, at least about 40, at least about 45, at least about 50, at least about 55, at least about 60, at least about 65, at least about 70, at least about 75, at least about 80, at least about 85, at least about 90, at least about 95 percent and/or not more than about 99.5, not more than about 99, not more than about 97, not more than about 95, not more than about 90, not more than about 85, not more than about 80, not more than about 75, not more than about 70, not more than about 65, or not more than about 60 weight percent, based on the total weight of aldehyde residues of the first or second poly(vinyl acetal) resin. At least one of the first and second poly(vinyl acetal) resins can include residues of at least one high RI aldehyde in an amount in the range of from about 0.5 to about 99.5, about 10 to about 90, about 25 to about 75, or about 40 to about 60 weight percent, based on the total weight of aldehyde residues of the first or second poly(vinyl acetal) resin.

The amount of high RI aldehyde residues can be determined using a combination of Fourier Transform Infrared Spectroscopy (FT-IR) and Size Exclusion Chromatography (SEC) with UV detection. In particular, FT-IR is used to measure residual hydroxyl of the resin and SEC is used to determine the amount of high RI aldehyde residues, with the amount of any other aldehyde residues being determined by the difference. The FT-IR analysis is performed using a Perkin Elmer Spectrum 100 FT-IR Spectrometer (commercially available from Perkin Elmer, Waltham, Mass.) with an ATR sampling attachment. The analysis is performed using 8 scans at a 4 cm-1 resolution. Prior to testing, a calibration is generated from several poly(vinyl n-butyral) samples of varying residual hydroxyl which have been dried in a desiccator with silica overnight at room temperature to remove excess moisture. The peak maximum wave number of the hydroxyl stretching band are correlated with the molar vinyl alcohol content of each sample, which was previously determined by ASTM D1396, and the resulting linear curve fits are used to predict molar residual hydroxyl content of the samples being analyzed. These values can be converted to weight percent by calculation after determination of the composition of the poly(vinyl acetal) resin using SEC analysis has been completed, as described below.

The SEC analysis is performed using a Waters 2695 Alliance pump and autosampler with a Waters 410 inline differential refractive index detector and a Waters 2998 PDA inline UV detector (commercially available from Waters Corporation, Milford, Mass.) with Dionex Chromeleon v. 6.8 data acquisition software with an extension pack (commercially available from Thermo Fischer Scientific, Sunnyvale, Calif.). The analysis is performed with a PL Gel Mixed C (5 micron) column and Mixed E (3 micron) columns with an injection volume of 50 microliters at a flow rate of 1.0 mL/minute. Samples are prepared by dissolving between 0.03 and 0.09 grams of resin in 10-15 mL of stabilized tetrahydrofuran and then filtering each through a 0.22 micron PTFE filter. Initial calibrations of the chromatograph are performed using a narrow molecular weight polystyrene standard and a poly(vinyl acetal) resin including only residues of the high RI aldehyde, and subsequent samples were calibrated with a broad molecular weight polystyrene (commercially available as PSBR250K from American Polymer Standard Corporation, Mentor, Ohio).

In some embodiments, only one of the first and second poly(vinyl acetal) resins includes residues of the high RI aldehyde, while, in other embodiments, both of the resins may include such residues. The refractive index of a resin comprising residues of a high RI aldehyde can be at least about 1.492, at least about 1.495, at least about 1.500, at least about 1.505, at least about 1.510, or at least about 1.515.

In various embodiments, at least one of the first and second poly(vinyl acetal) resins may also include residues of at least one aldehyde having a refractive index of less than 1.421. Examples of these aldehydes can include, for example, aliphatic aldehydes such as the $C_4$ to $C_8$ aldehydes discussed above. The aldehydes having a refractive index of less than 1.421 can be selected from the group consisting of n-butyraldehyde, iso-butyraldehyde, and 2-ethylhexyl aldehyde.

When these residues are present, the first and/or second poly(vinyl acetal) resin can include at least about 10, at least about 15, at least about 20, at least about 25, at least about 30, at least about 35, at least about 40, at least about 45, at least about 50, at least about 55, at least about 60, at least about 65, at least about 70, at least about 75, at least about 80, at least about 85, at least about 90, at least about 95 percent and/or not more than about 99, not more than about 97, not more than about 95, not more than about 90, not more than about 85, not more than about 80, not more than about 75, not more than about 70, not more than about 65, or not more than about 60 weight percent, of these aldehydes, based on the total weight of aldehyde residues of the first or second poly(vinyl acetal) resin.

The amount of residues of an aldehyde having a refractive index of less than 1.421 are determined using the FT-IR/SEC method described above and then by calculation according to the following formula: 100 weight percent−weight percent residual hydroxyl (from FT-IR)−weight percent of high RI aldehyde residues (from SEC)−weight percent residual acetate (from FT-IR)=weight percent of residues of aldehyde having refractive index less than 1.421. The first and/or second poly(vinyl acetal) resin can include residues of an aldehyde having a refractive index of less than 1.421 in an amount in the range of from about 10 to about 99, about 25 to about 75, or about 40 to about 60 weight percent, based on the total weight of aldehyde residues of the first or second poly(vinyl acetal) resin. The refractive index of one of these resins can be less than about 1.492, less than about 1.491, or less than about 1.490, measured as described previously.

According to some embodiments, one of the first and second poly(vinyl acetal) resins primarily includes residues of a high RI aldehyde, while the other of the first and second poly(vinyl acetal) resins primarily includes residues of at least one aldehyde having a refractive index of less than 1.421. As used herein, the term "primarily" means at least 75 weight percent, so that a poly(vinyl acetal) resin primarily including residues of a specified aldehyde includes at least 75 weight percent of residues of the specified aldehyde, based on the total weight of aldehyde residues of that resin. The poly(vinyl acetal) resin primarily including residues of a high RI aldehyde can include not more than about 25, not more than about 20, not more than about 15, not more than about 10, not more than about 5, not more than about 2, or not more than about 1 weight percent of residues of other aldehydes having a refractive index less than 1.421, based on the total weight of aldehyde residues of the resin.

Similarly, the other poly(vinyl acetal) resin, which can primarily include residues of an aldehyde having a refractive index of less than 1.421, may comprise not more than about 25, not more than about 20, not more than about 15, not more than about 10, not more than about 5, not more than about 2, or not more than about 1 weight percent of residues of a high RI aldehyde, based on the total weight of aldehyde residues of the resin, and may include at least about 75, at least about 80, at least about 85, at least about 90, at least about 95, at least about 97, or at least about 99 percent of residues of one or more aldehydes having a refractive index less than 1.421. In some embodiments, the ratio of the resin primarily including residues of the high RI aldehyde to the other resin or resins in the composition can be at least about 1:99, at least about 5:95, at least about 10:90, at least about 20:80, at least about 25:75, at least about 30:70, at least about 40:60 and/or not more than about 99:1, not more than about 95:5, not more than about 90:10, not more than about 85:15, not more than about 75:25, not more than about 70:30, or not more than about 60:40, or in the range of from about 1:99 to 99:1, about 10:90 to about 90:10, about 25:75 to 75:25, or about 40:60 to 60:40.

In other embodiments, at least one of the first and second poly(vinyl acetal) resins includes residues of a high RI aldehyde and at least one aldehyde having a refractive index of less than 1.421, thereby forming a "hybrid" resin that includes residues of both high and low RI aldehydes. According to these embodiments, the amounts of the high RI aldehyde residues and the residues of aldehydes having a refractive index of less than 1.421, as well as the weight ratios of one to the other, in the hybrid resin can be within the same ranges provided above with respect to the resin blends. When the first or second poly(vinyl acetal) resin includes residues of both high RI and lower RI aldehydes, the other of the two poly(vinyl acetal) resins may also include residues of at least one high RI aldehyde. Alternatively, the other of the two resins may include little or no high RI aldehyde residues, such that it includes less than about 10, less than about 5, less than about 2, or less than about 1 weight percent of residues of a high RI aldehyde, with the balance being residues of an aldehyde having a refractive index of less than 1.421, including, for example, aldehydes selected from the group consisting of n-butyraldehyde, iso-butyraldehyde, 2-ethylhexyl aldehyde, and combinations thereof.

When the interlayer is a multilayer interlayer, it can include at least one resin layer having at least a first poly(vinyl acetal) resin and another resin layer comprising at least a second poly(vinyl acetal) resin, wherein the difference between the residual hydroxyl content of the first poly(vinyl acetal) resin and the second poly(vinyl acetal) resin is at least 2 weight percent. One or both of the poly(vinyl acetal) resins can include residues of a high RI aldehyde and one of the resin layers may have a refractive index that is higher or lower than the other by at least about 0.002, at least about 0.003, at least about 0.004 and/or not more than about 0.010, not more than about 0.009, not more than about 0.008, or not more than about 0.007, or by an amount in the range of from about 0.002 to about 0.010, about 0.003 to about 0.009, or about 0.004 to about 0.007. In some embodiments when the interlayer includes at least three resin layers, the innermost resin layer can have the higher refractive index, while in other embodiments, the refractive index of one or both of the outer resin layers may be higher. In some embodiments, only one of the first and second poly(vinyl acetal) resins may include residues of the high RI aldehyde. In other embodiments, both of the poly(vinyl acetal) resins may include residues of at least one high RI aldehyde, but the resins can still exhibit a difference in refractive index within the ranges provided above.

One or both of the poly(vinyl acetal) resins can include residues of at least one high RI aldehyde. In some embodiments, when the poly(vinyl acetal) resin including such residues has a residual hydroxyl content of not more than, for example, 15 weight percent, the resin layer including such a resin may have a glass transition temperature of less than 20, not more than about 15, not more than about 10, not more than about 5, not more than about 0, not more than about −5, or not more than about −10° C. and a refractive index of at least about 1.465, at least about 1.470, at least about 1.475, at least about 1.480, at least about 1.485, or at least about 1.490, each measured as described previously. The plasticizer content of the layer, according to various embodiments, can be at least about 50, at least about 55, at least about 60, at least about 65 phr and/or not more than about 120, not more than about 110, not more than about 90, not more than about 85, not more than about 80, or not more than about 75 phr, or in the range of from about 50 to about 120, about 55 to about 110, about 60 to about 90, or about 65 to about 75 phr.

When the resin having the residues of a high RI aldehyde in the multilayer interlayer discussed above has a residual hydroxyl content greater than, for example 16 weight percent, the resin layer including that resin may have a glass transition temperature of at least about 26, at least about 30, at least about 33, or at least about 35° C., and a refractive index of at least about 1.470, at least about 1.475, at least about 1.480, at least about 1.485, or at least about 1.490, each measured as described previously. The plasticizer content of the layer, according to some embodiments, can be less than 50 phr, not more than about 45 phr, not more than about 40 phr, not more than about 30, not more than about 20 phr.

According to various embodiments of the present invention, the RI balancing agent can comprise a liquid RI balancing agent. As used herein, the term "liquid RI balancing agent" refers to an RI balancing agent that is liquid at standard conditions of 25° C. and 1 atm. In some embodiments, the liquid RI balancing agent can be, for example, a high RI plasticizer. As used herein, the term "high RI plasticizer," refers to a plasticizer having a refractive index of at least 1.460, measured as described previously. The high RI plasticizers suitable for use as RI balancing agents can have a refractive index of at least about 1.470, at least about 1.480, at least about 1.490, at least about 1.500, at least about 1.510, at least about 1.520 and/or not more than about 1.600, not more than about 1.575, or not more than about 1.550, measured as discussed above. The refractive index of the high RI plasticizers may be in the range of from about 1.460 to about 1.600, about 1.470 to about 1.575, about 1.480 to about 1.550, about 1.490 to about 1.525.

Examples of types or classes of high RI plasticizers can include, but are not limited to, polyadipates (RI of about 1.460 to about 1.485); epoxides such as epoxidized soybean oils (RI of about 1.460 to about 1.480); phthalates and terephthalates (RI of about 1.480 to about 1.540); benzoates and toluates (RI of about 1.480 to about 1.550); and other specialty plasticizers (RI of about 1.490 to about 1.520). Specific examples of suitable RI plasticizers can include, but are not limited to, dipropylene glycol dibenzoate, tripropylene glycol dibenzoate, polypropylene glycol dibenzoate, isodecyl benzoate, 2-ethylhexyl benzoate, diethylene glycol benzoate, butoxyethyl benzoate, butoxyethoxyethyl benzoate, butoxyethoxyethoxyethyl benzoate, propylene glycol dibenzoate, 2,2,4-trimethyl-1,3-pentanediol dibenzoate, 2,2,4-trimethyl-1,3-pentanediol benzoate isobutyrate, 1,3-butanediol dibenzoate, diethylene glycol di-o-toluate, triethylene glycol di-o-toluate, dipropylene glycol di-o-toluate, 1,2-octyl dibenzoate, tri-2-ethylhexyl trimellitate, di-2-ethylhexyl terephthalate, bis-phenol A bis(2-ethylhexonate), di-(butoxyethyl) terephthalate, di-(butoxyethoxyethyl) terephthalate, and mixtures thereof. The high RI plasticizer may be selected from dipropylene glycol dibenzoate and tripropylene glycol dibenzoate, and/or 2,2,4-trimethyl-1,3-pentanediol dibenzoate.

When the resin layer or interlayer includes a high RI plasticizer, the plasticizer can be present in the layer alone or it can be blended with one or more additional plasticizers. The other plasticizer or plasticizers may also comprise high RI plasticizers, or one or more may be a lower RI plasticizer having a refractive index of less than 1.460. In some embodiments, the lower RI plasticizer may have a refractive index of less than about 1.450, less than about 1.445, or less than about 1.442 and can be selected from the group listed previously. When a mixture of two or more plasticizers are employed as a RI balancing agent, the mixture can have a refractive index within one or more of the above ranges.

When used as an RI balancing agent in a multilayer interlayer, a high RI plasticizer may be present in different amounts in two or more of the resin layers. Similarly, when used as an RI balancing agent in a resin composition or blended resin layer, the high RI plasticizer may be partitioned as described previously, such that resin layers or domains having a lower residual hydroxyl content may have higher amounts of the high RI plasticizer. In some embodiments, at least one layer or portion of a resin layer or interlayer may comprise a high RI plasticizer as an RI balancing agent in an amount of at least about 5, at least about 10, at least about 15, at least about 20, at least about 25, at least about 30, at least about 35 and/or not more than about 50, not more than about 45, or not more than about 40 phr. The high RI plasticizer can be present in the resin layer or interlayer in an amount in the range of from about 5 to about 50, about 10 to about 45, about 20 to about 40 phr. In some embodiments, one or more other layers or portions can include the high RI plasticizer in an amount of at least about 50, at least about 55, at least about 60, at least about 65, at least about 70 and/or not more than about 120, not more than about 110, not more than about 100, not more than about 90, or not more than about 75 phr, or in the range of from about 50 to about 120, about 55 to about 110, about 60 to about 90, about 65 to about 75 phr. These amounts may include any other plasticizers present in the composition, including those having a refractive index less than 1.460, or may include only the high RI plasticizer.

When a high RI plasticizer is used as an RI balancing agent in a multilayer interlayer, the interlayer can include at least one resin layer having a first poly(vinyl acetal) resin and another resin layer comprising a second poly(vinyl acetal) resin, wherein the difference between the residual hydroxyl content of the first poly(vinyl acetal) resin and the second poly(vinyl acetal) resin is at least 2 weight percent. At least one of the resin layers can include a high RI plasticizer in an amount sufficient so that the absolute value of the difference between the refractive index of the resin layer and the refractive index of the another resin layer is not more than 0.010. In some embodiments when the interlayer includes at least three resin layers, the innermost resin layer can have a higher refractive index, while in other embodiments, the refractive index of one or both of the outer resin layers may be higher.

When a high RI plasticizer is included in a resin layer that includes at least one poly(vinyl acetal) resin having the lower residual hydroxyl content, at least a portion of the resin layer can have a glass transition temperature of not more than 25, not more than about 20, not more than about 15, not more than about 10, not more than about 5, not more than about 0, not more than about −5, or not more than about −10° C., and the layer can have a refractive index of at least about 1.465, at least about 1.470, at least about 1.475, at least about 1.480, at least about 1.485, or at least about 1.490, measured as described previously. The plasticizer content of this layer, in some embodiments, can be at least about 50, at least about 55, at least about 60 phr and/or not more than about 120, not more than about 110, not more than about 90, not more than about 85, not more than about 80, or not more than about 75 phr, or in the range of from about 50 to about 120, about 55 to about 110, about 60 to about 90, or about 60 to about 75 phr.

When the high RI plasticizer is present in the resin layer that comprises the poly(vinyl acetal) resin having a higher residual hydroxyl content, at least a portion of the layer can have a glass transition temperature of at least about 26, at least about 30, at least about 33, or at least about 35° C., and the layer can have a refractive index of at least about 1.470, at least about 1.475, at least about 1.480, at least about 1.485, or at least about 1.490, measured as described previously. The plasticizer content of this layer, according to some embodiments, can be less than 50 phr, not more than about 45 phr, not more than about 40 phr, not more than about 30, or not more than about 20 phr.

According to various embodiments of the present invention, the RI balancing agent may be a solid RI additive present in one or more layers or portions of a layer or interlayer. As used herein, the term "solid RI additive" refers to an additive used to adjust the refractive index of a poly(vinyl acetal) resin, resin layer, or interlayer and which is solid at ambient conditions of 25° C. and 1 atm. In various embodiments, the solid RI additive may have a melting point of at least about 27, at least about 30, at least about 35, at least about 40, at least about 45, at least about 50, at least about 55, at least about 60, at least about 75, at least about 80, at least about 85, at least about 90, at least about 95, or at least about 100° C. When employed in a resin blend, layer, or interlayer, the solid RI additive can be present in an amount sufficient such that the absolute value of the difference between the refractive indices of the first and second resin layers is not more than about 0.010. The difference between the refractive index of the first and second resin layers may be greater than 0.010, when formulated into identical resin layers in the absence of the solid RI additive.

In some embodiments, the solid RI additive can be a high RI solid additive for increasing the refractive index of at least one resin layer or interlayer. The refractive index of the high RI solid additive can be at least about 1.460, at least about 1.465, at least about 1.470, at least about 1.475, at least about 1.480, at least about 1.485, at least about 1.490, at least about 1.495, at least about 1.500, at least about 1.505, at least about 1.510, at least about 1.525, at least about 1.550, at least about 1.575, or at least about 1.600, measured as described previously. In other embodiments, the solid RI additive may be a RI lowering solid additive for reducing the refractive index of at least one resin or resin layer. The RI lowering solid additive can have a refractive index of less than 1.460, not more than about 1.455, not more than about 1.450, not more than about 1.445, or not more than about 1.440, measured as described previously. Whether higher or lower, the solid RI additive can have a refractive index that is at least about 0.005, at least about 0.010, at least about 0.050, at least about 0.10 and/or not more than about 0.50, not more than about 0.35, or not more than about 0.20 different than the refractive index of the poly(vinyl acetal) resin. The difference in refractive index between the solid RI additive and the poly(vinyl acetal) resin can be in the range of from about 0.005 to about 0.50, about 0.010 to about 0.35, or about 0.050 to about 0.35.

In various embodiments, the solid RI additive can be present in a resin composition or interlayer in an amount of at least about 0.5, at least about 1, at least about 1.5, at least about 2, or at least about 5 phr, depending on the specific type of additive and layer or interlayer. The solid RI additive, whether a high RI additive or an RI lowering additive, may comprise a physical solid RI additive capable of being physically mixed or blended with at least one poly(vinyl acetal) resin in a resin composition or layer, or it can be a reactive solid RI additive, which may react with and become incorporated into the backbone of one or more poly(vinyl acetal) resins.

The solid RI additive can be used in combination with one or more low RI plasticizers. Examples of low RI plasticizers can include, but are not limited to, triethylene glycol di-(2-ethylhexanoate) ("3GEH"), triethylene glycol di-(2-ethylbutyrate), triethylene glycol diheptanoate, tetraethylene glycol diheptanoate, tetraethylene glycol di-(2-ethylhexanoate) ("4GEH"), dihexyl adipate, dioctyl adipate, hexyl cyclohexyladipate, diisononyl adipate, heptylnonyl adipate, di(butoxyethyl) adipate, and bis(2-(2-butoxyethoxy)ethyl) adipate, dibutyl sebacate, dioctyl sebacate, and mixtures thereof. The plasticizer may be selected from the group consisting of triethylene glycol di-(2-ethylhexanoate) and tetraethylene glycol di-(2-ethylhexanoate), or the plasticizer can comprise triethylene glycol di-(2-ethylhexanoate). The solid RI additive can also be used in combination with one or more high RI plasticizers mentioned previously.

When the solid RI additive is a physical solid RI additive, it may be combined with one or more poly(vinyl acetal) resins or layers in an interlayer. In some embodiments, the physical solid RI additive may be present in at least one layer or in an interlayer in an amount of at least about 1, at least about 2, at least about 3, at least about 5, at least about 8, at least about 10, at least about 12, at least about 15, at least about 20 and/or not more than about 60, not more than about 55, not more than about 50, not more than about 45, not more than about 40, not more than about 35, not more than about 30, not more than about 25, not more than about 20, or not more than about 15 phr, or in an amount in the range of from about 1 to about 60, about 5 to about 50, or about 10 to about 45 phr. Examples of suitable physical solid high RI additives can include, but are not limited to, polyadipates, polystyrene having a molecular weight of less than 2500, epoxides, phthalic acid esters, benzoic acid esters, inorganic oxides such as, for example, zirconium oxide, and combinations thereof. Physical solid RI lowering additives can be selected from the group consisting of halogenated additives, and silicon-containing additives.

When utilized in a multilayer interlayer, the physical solid RI additive may be present in one of the resin layers in a higher amount than one or more other layers. The difference between the amount of the physical solid RI additive present in one of the resin layers and the amount of physical solid RI additive present in another layer, including, for example, an adjacent layer, can be at least about 2, at least about 5, at least about 8, at least about 10 phr and/or not more than about 30, not more than about 25, or not more than about 20 phr, or it can be in the range of from about 2 to about 30, about 5 to about 25, or about 10 to about 20 phr. According to some embodiments, at least one of the layers can include at least about 1, at least about 5, at least about 10, at least about 15 phr and/or not more than about 60, not more than about 55, not more than about 50, not more than about 45 phr of the physical solid RI additive, or the physical solid RI additive can be present in an amount in the range of from about 1 to about 60, about 10 to about 50, or about 15 to about 45 phr. In some embodiments, the physical solid RI additive can be present in one or more layers in an amount of at least about 5, at least about 10, at least about 15, at least about 20 phr and/or not more than about 60, not more than about 55, not more than about 50 phr, or in an amount in the range of from about 5 to about 60, about 15 to about 55, or about 20 to about 50 phr.

When the multilayer interlayer comprises three or more resin layers and the solid RI additive is a solid high RI additive, the inner, or core, layer or layers can include higher amounts of the physical solid RI additive than the outer, or skin, layers. However, if the solid RI additive is a solid RI lowering additive, the outer skin layers may include higher amounts of the solid RI additive than the inner core layer. The core layer can include at least about 30, at least about 40, at least about 50, at least about 60, at least about 70, or at least about 80 percent of the total amount of physical solid RI additive present in the interlayer.

When the solid RI additive is a reactive solid RI additive, it may be reacted with at least one poly(vinyl acetal) resin such that at least a portion of the additive is incorporated into the polymer chain. The reactive RI additive can be an aromatic additive and can comprise, in some embodiments, phthalic anhydrides and phenylalkoxysilanes including, for example, diphenyldimethoxysilane.

In some embodiments, the reactive RI additive may be present in one layer of a multilayer interlayer in a higher amount than it is present in one or more other layers of the interlayer. In some embodiments, it may be absent, or substantially absent, from one or more resin layers. For example, when the interlayer is a multilayer interlayer including at least three resin layers, the inner core layer may include at least about 0.5, at least about 1, at least about 1.5, at least about 2, at least about 2.5, at least about 3 and/or not more than about 50, not more than about 30, not more than about 20, not more than about 15, not more than about 12, not more than about 10, or not more than about 8 phr of one or more reactive solid RI additives, or an amount in the range of from about 0.5 to about 20, about 1 to about 12, or about 2 to about 8 phr. The outer skin layer or layers may include not more than about 10, not more than about 5, not more than about 2, not more than about 1, or not more than about 0.5 phr of the reactive solid RI additive. The core layer can include at least about 65, at least about 75, at least about 85, at least about 95, or at least about 99 percent of the total amount of the reactive RI additive present in the interlayer.

When a solid RI additive is used as an RI balancing agent in a multilayer interlayer, the interlayer can include at least one resin layer having a first poly(vinyl acetal) resin and another resin layer comprising a second poly(vinyl acetal) resin, wherein the difference between the residual hydroxyl content of the first poly(vinyl acetal) resin and the second poly(vinyl acetal) resin is at least 2 weight percent. At least one of the resin layers can include the high RI additive in an amount sufficient so that the absolute value of the difference between the refractive index of the first resin layer and the refractive index of the second resin layer is not more than 0.010. In some embodiments when the interlayer includes at least three resin layers, the innermost resin layer can have a higher refractive index, while in other embodiments, the refractive index of one or both of the outer resin layers may be higher.

When a solid RI additive is included in a resin layer comprising the poly(vinyl acetal) resin having the lower residual hydroxyl content, the resin layer can have a glass transition temperature of not more than 25, not more than about 20, not more than about 15, not more than about 10, not more than about 5, not more than about 0, not more than about −5, or not more than about −10° C., and a refractive index of at least about 1.465, at least about 1.470, at least about 1.475, at least about 1.480, at least about 1.485, at least about 1.495, or at least about 1.500, each measured as described previously. The plasticizer content of this layer, in some embodiments, can be at least about 50, at least about 55, at least about 60, at least about 65 phr and/or not more than about 120, not more than about 110, not more than about 90, not more than about 85, not more than about 80, or not more than about 75 phr, or in the range of from about 50 to about 120, about 55 to about 110, about 60 to about 90, about 65 to about 75 phr.

When the solid RI additive is present in the resin layer that comprises the poly(vinyl acetal) resin having a higher residual hydroxyl content, the layer can have a glass transition temperature of at least about 26, at least about 30, at least about 33, or at least about 35° C. In some embodiments, the layer can have a refractive index of at least about 1.470, at least about 1.475, at least about 1.480, at least about 1.485, at least about 1.490, at least about 1.500, at least about 1.510. The plasticizer content of this layer, according to some embodiments, can be less than 50 phr, not more than about 45 phr, not more than about 40 phr, not more than about 30, or not more than about 20 phr.

Resin compositions, layers, and interlayers formulated according to various embodiments of the present invention to include at least two poly(vinyl acetal) resins and an RI balancing agent can exhibit enhanced optical properties without sacrificing other properties such as impact resistance and acoustic performance. As discussed above, due to differences in properties or composition of the resins, such as, for example, residual hydroxyl content, residual acetate content, or aldehyde residues, identical blends of the same resins formulated without the RI balancing agent may provide compositions, layers, and interlayers with reduced optical performance.

Clarity is one parameter used to describe the optical performance of compositions, layers, and interlayers described herein and may be determined by measuring haze value or percent. Haze value represents the quantification of light scattered by a sample in contrast to the incident light. In some embodiments, the resin blends, layers, and interlayers described herein may have a haze value of less than 5 percent, less than about 4 percent, less than about 3 percent, less than about 2 percent, less than about 1, or less than about 0.5 percent, as measured in accordance with ASTM D1003-13—Procedure B using Illuminant C, at an observer angle of 2 degrees. The test is performed with a spectrophotometer, such as a Hunterlab UltraScan XE instrument (commercially available from Hunter Associates, Reston, Va.), on a polymer sample having a thickness of 0.76 mm, which has been laminated between two sheets of clear glass each having a thickness of 2.3 mm (commercially available from Pittsburgh Glass Works of Pennsylvania).

Additionally, the resin layers and interlayers described herein may have a mottle value of not more than 3, not more than 2, or not more than 1. Mottle is another measure of optical quality, which is detected as a texture or graininess. Mottle is a visual defect if the level is too high or too severe, thereby causing objectionable visual appearance. Mottle is assessed and categorized by a side-by-side qualitative comparison of shadowgraph projections for a test laminate with a set of standard laminate shadowgraphs that represent a series, or scale, of mottle values ranging from 1 to 4, with 1 representing a standard of low mottle (i.e., a low number of disruptions) and 4 representing a standard of high mottle (i.e., a high number of disruptions). High mottle is generally considered objectionable, particularly in automotive and architectural applications. Optionally, a model laminate having a single layer interlayer with zero mottle (no mottle) is used to facilitate the evaluation in a test laminate that has a mottle rating lower than the scale of the standard set, such as lower than a rating of 1. A test laminate that shows a shadowgraph projection similar to that of a zero-mottle laminate is assessed to have a mottle rating of zero. The test laminate is prepared with two sheets of clear glass each having a thickness of 2.3 mm (commercially available from Pittsburgh Glass Works of Pennsylvania) and an interlayer. The interlayer typically has a random rough surface $R_z$ of about 35 to 40 microns and thickness of 0.76 to 0.86 mm.

The mottle values provided herein were determined using a Clear Mottle Analyzer (CMA) that includes a xenon arc lamp, a sample holder, a projection screen, and a digital camera. The xenon arc lamp is used to project a shadowgraph of a laminated sample onto the screen and the camera is configured to capture an image of the resulting shadowgraph. The image is then digitally analyzed using computer imaging software and compared to images of previously-captured standard samples to determine the mottle of the sample. A method of measuring mottle using a CMA is described in detail in U.S. Patent Application Publication No. US 2012-0133764.

Another parameter used to determine the optical performance is transparency, or percent visual transmittance (% $T_{vis}$), which is measured using a spectrophotometer, such as a HunterLab UltraScan EX, in accordance with ASTM D1003, Procedure B using Illuminant C at an observer angle of 2°. The values provided herein were obtained by analyzing a glass laminate samples having an interlayer thickness of about 0.76 mm and a clear glass thickness of 2.3 mm (commercially available from Pittsburgh Glass Works of Pennsylvania). In some embodiments, the resin layers and interlayers of the present invention can have a percent visual transmittance of at least about 70, at least about 75, at least about 80, at least about 81, at least about 82, at least about 83, at least about 84, at least about 85, at least about 85.5, at least about 86, at least about 86.5, at least about 87, at least about 87.5, at least about 88, or at least about 88.5 percent. More specifically, the resin layers and interlayers of the present invention have a % $T_{vis}$ of greater than 85 for the interlayers containing only additives of ACAs, UV stabilizers, and antioxidant, or greater than 80% for the interlayers containing additional additives such as pigments, IR absorbers or blockers as mentioned above. Polymer interlayers containing high levels of pigments and/or dyes may have lower % $T_{vis}$ values as desired, such as in mass pigmented or colored polymer interlayers.

In addition to exhibiting one or more optical properties within the ranges above, the resin layers and interlayers described herein may also exhibit acoustic properties within a desirable range. In some embodiments, as discussed above, at least a portion of a resin layer or interlayer may have a glass transition temperature of not more than 25, not more than about 20, not more than about 15, not more than about 10, not more than about 5, not more than about 0, not more than about −5, or not more than about −10° C., which may facilitate acoustic performance of the layer or interlayer. At the same time, at least a portion of the layer or interlayer may have a glass transition temperature of at least about 26, at least about 30, at least about 35° C., which may facilitate impact resistance properties and strength.

In some embodiments, a resin layer or interlayer according to the present invention may have a tan delta value of at least about 0.70. Tan delta is the ratio of the loss modulus (G") in Pascals to the storage modulus (G') in Pascals of a specimen measured by Dynamic Mechanical Thermal Analysis (DMTA). The DMTA is performed with an oscillation frequency of 1 Hz under shear mode and a temperature sweep rate of 3° C./min. The peak value of the G"/G' curve at the glass transition temperature is the tan delta value. Resin layers or interlayers as described according to various embodiment herein can have a tan delta of at least about 1.0, at least about 1.05, at least about 1.10, at least about 1.25, at least about 1.50, at least about 1.75, at least about 2.0, or at least about 2.25.

Additionally, the resin layers and interlayers can have a damping loss factor, or loss factor, of at least about 0.10, at least about 0.15, at least about 0.17, at least about 0.20, at least about 0.25, at least about 0.27, at least about 0.30, at least about 0.33, or at least about 0.35. Loss factor is measured by Mechanical Impedance Measurement as described in ISO Standard 16940. A polymer sample is laminated between two sheets of clear glass, each having a thickness of 2.3 mm, and is prepared to have a width of 25 mm and a length of 300 mm. The laminated sample is then excited at the center point using a vibration shaker, commercially available from Brüel and Kjær (Nærum, Netherlands) and an impedance head (Brüel and Kjær) is used to measure the force required to excite the bar to vibrate and the velocity of the vibration. The resultant transfer function is recorded on a National Instrument data acquisition and analysis system and the loss factor at the first vibration mode is calculated using the half power method. In some embodiments, when the RI balancing agent is a high RI plasticizer, the layer or interlayer may have a loss factor greater than 0.25, greater than 0.27, greater than 0.30, or greater than 0.35 at 20° C., while, in other embodiments, when the RI balancing agent is a solid RI additive or residues of at least one high RI aldehyde, the layer or interlayer may have a loss factor of at least about 0.10, at least about 0.15, at least about 0.20, at least about 0.25, or at least about 0.30° C. 20° C.

Similar to the resin blend of two distinct resins of the first poly(vinyl acetal) resin and the second poly(vinyl acetal) resin, blending two or more distinct resin layers or interlayers can often result in the new resin layer(s) or interlayer(s) having unexpected properties and performance attributes. For example, a resin layer or interlayer having lower residual hydroxyl content and lower glass transition temperature may be blended with another resin layer or interlayer having higher residual hydroxyl content and higher glass transition temperature, resulting a new resin layer or interlayer having soft domains of lower glass transition temperature, which enhances its acoustic performance, and stiff domains of higher glass transition temperature, which imparts enhanced processability, strength, and impact resistance to the resin layer or interlayer. Other example includes blending a single sheet interlayer and multilayer interlayer, blending two multilayer interlayers, or blending one multilayer interlayer into a resin layer of another multilayer interlayer. In essence, the effect arising from blending two materials can also be achieved from blending two or more resins, plasticizers, and other additives according to the contents of the materials. As used herein, a "blend resin material" or "blend material" refers to the resin composition, resin layer or interlayer to be blended into another resin composition, resin layer or interlayer. In blending two resin layers or two interlayers, at least one of the two materials to be blended can include the resin layer or interlayer of the present invention. In other embodiments, both materials can include the resin layers or interlayers of the present invention.

According to some embodiments, at least a portion of the resin compositions, layers, or interlayers described herein may comprise another resins, layers, or interlayers. In some embodiments, at least about 0.5, at least about 1, at least about 5, at least about 10, at least about 15, at least about 20, at least about 25, at least about 30, or at least about 50 percent of the total amount of resin in a composition, layer, or interlayer can originate from a blend resin material.

Often, when the type and/or amount of resins and plasticizers in the blend resin material differ substantially from the type and/or amount of the resin or plasticizer being produced, and into which the blend resin material is being added, the optical performance, as determined by the clarity or haze, of the resulting resin composition, layer, or interlayer that includes the blend resin material may be adversely impacted. According to embodiments of the present invention, resin layers and interlayers that include higher levels of blend resin material can be produced by utilizing one or more of the RI balancing agents discussed above.

When the RI balancing agent includes a high RI plasticizer, higher amounts of blend resin materials can be added to a process for producing a resin composition, layer, or interlayer described herein without reducing the clarity or increasing the haze of the final composition, layer, or interlayer. In some embodiments, the composition that includes blend materials can include a first poly(vinyl acetal) resin and a second poly(vinyl acetal) resin, wherein one of the resins has a residual hydroxyl content that can be at least 2 weight percent lower than the residual hydroxyl content of the other resin. Such a composition may further include at least one high RI plasticizer having a refractive index of 1.460, and, in some embodiments, more than 3 percent of the combined amount of the first and second poly(vinyl acetal) resins present in the composition, layer, or interlayer may have originated from a blend composition, layer, or interlayer. Despite the difference in residual hydroxyl contents of the first and second poly(vinyl acetal) resins, the composition that includes more than 0.5 weight percent of blend resin materials may have a haze value of not more than about 5, not more than about 4, not more than about 3, not more than about 2, or not more than about 1, or not more than about 0.5.

The high RI plasticizer used as an RI balancing agent with blend resin compositions can have a refractive index within one or more of the ranges described previously. The high RI plasticizer may be added during production of the composition, layer, or interlayer along with the blend material and/or at least a portion of the high RI plasticizer may be present in the blend resin material added to the process. Additionally, one or more other plasticizers may also be present in the resin material being blended and/or in the resin composition, layer, or interlayer being produced, including, for example, those having a refractive index less than about 1.450, less than about 1.445, or less than about 1.442, measured as described previously. In some embodiments, one or more additional high RI plasticizers may also be present in the blend material and/or in the resin composition, layer, or interlayer into which the materials are being blended.

The resin composition that includes blended resin material as described above can be used to form layers and interlayers according to various embodiments of the present invention. For example, the resin composition including a blend resin material can be used to form a single monolithic interlayer, or it may be used to form one or more layers of a multilayer interlayer. When used in various layers and interlayers, additional plasticizer may be added such that the total amount of plasticizer present in the resin layer or interlayer can be within the range described previously. Similarly, the glass transition temperature and refractive indices of resin layers and interlayers formed from a composition that includes a blend resin material may also be within the ranges provided above. Additionally, resin layers and interlayers formed from a composition that includes blended materials may also exhibit acoustic properties as described previously and may be included in any of the applications described below.

According to some embodiments, at least a portion of the resin compositions, layers, or interlayers described herein may comprise one or more recycled resin materials, including, for example, recycled layers or interlayers. As used herein, the term "recycled" means removed from and subsequently returned to a production line. Often, utilizing recycled materials may adversely affect the optical performance of the final composition, layer, or interlayer, as determined by clarity or haze, because of the different compositions and properties of the materials being blended or combined. However, in some embodiments, layers or interlayers as described herein may include at least one recycled resin material, while still exhibiting the same optical and/or acoustic properties as described herein. The type and/or amount of recycle resin material may fall within one or more of the ranges described previously and the layer or interlayer may further include at least one RI balancing agent. Additionally, the resin layers and interlayers including recycled resin material may also have optical and/or acoustic performance within one or more of the ranges described below.

The resin compositions, layers, and interlayers described above may be produced according to any suitable method. In various embodiments, the method for producing these compositions, layers, and interlayers can include providing two or more poly(vinyl acetal) resins, blending at least one resin with an RI balancing agent and, optionally, at least one plasticizer or other additive, to form a blended composition, and forming a layer from the blended composition.

In some embodiments, the resins provided in the initial steps of the method can be in the form of one or more poly(vinyl acetal) resins, while, in other embodiments, one or more resin precursors can also be provided. In some embodiments, when two or more poly(vinyl acetal) resins are physically blended, the blending of the two resins can comprise melt blending and may be performed at a temperature of at least about 140, at least about 150, at least about 180, at least about 200, at least about 250° C. In other embodiments, when the poly(vinyl acetal) resin components provided include resin precursors, the blending step may include reacting two or more aldehydes with a polyvinyl alcohol to provide a single poly(vinyl acetal) resin having two or more aldehyde moieties. Additionally, a portion of the blending step can include blending one or more of the resins with at least one plasticizer and/or with one or more of the RI balancing agents described previously.

The resulting blended resins can then be formed into one or more resin layers according to any suitable method. Exemplary methods of forming polymer layers and interlayers can include, but are not limited to, solution casting, compression molding, injection molding, melt extrusion, melt blowing, and combinations thereof. Multilayer interlayers including two or more resin layers may also be produced according to any suitable method such as, for example, co-extrusion, blown film, melt blowing, dip coating, solution coating, blade, paddle, air-knife, printing, powder coating, spray coating, and combinations thereof. In various embodiments of the present invention, the layers or interlayers may be formed by extrusion or co-extrusion. In an extrusion process, one or more thermoplastic polymers, plasticizers, and, optionally, at least one additive, including one or more RI balancing agents as described previously, can be pre-mixed and fed into an extrusion device. Other additives, such as ACAs, colorants, and UV inhibitors, which can be in liquid, powder, or pellet form, may also be used and may be mixed into the thermoplastic polymers or plasticizers prior to entering the extrusion device. These additives can be incorporated into the polymer resin and, by extension, the resultant polymer sheet, thereby enhancing certain properties of the polymer layer or interlayer and its performance in the final multiple layer glass panel or other end product.

In various embodiments, the thickness, or gauge, of the layers or interlayers can be at least about 10, at least about 15, at least about 20 mils and/or not more than about 100, not more than about 90, not more than about 60, not more than about 50, or not more than about 35 mils, or it can be in the range of from about 10 to about 100, about 15 to about 60, or about 20 to about 35 mils. In millimeters, the thickness of the polymer layers or interlayers can be at least about 0.25, at least about 0.38, at least about 0.51 mm and/or not more than about 2.54, not more than about 2.29, not more than about 1.52, or not more than about 0.89 mm, or in the range of from about 0.25 to about 2.54 mm, about 0.38 to about 1.52 mm, or about 0.51 to about 0.89 mm. In some embodiments, the resin layers or interlayers can comprise flat polymer layers having substantially the same thickness along the length, or longest dimension, and/or width, or second longest dimension, of the sheet, while, in other embodiments, one or more layers of a multilayer interlayer, for example, can be wedge-shaped or can have a wedge-shaped profile, such that the thickness of the interlayer changes along the length and/or width of the sheet, such that one edge of the layer or interlayer has a thickness greater than the other. When the interlayer is a multilayer interlayer, at least one, at least two, or at least three of the layers of the interlayer can be wedge-shaped. When the interlayer is a monolithic interlayer, the polymer sheet can be flat or wedge shaped. Wedge-shaped interlayers may be useful in, for example, heads-up-display (HUD) panels in automotive and aircraft applications.

The resin compositions, layers, and interlayers according to embodiments of the present invention may be utilized in a multiple layer panel that comprises a resin layer or interlayer and at least one rigid substrate. Any suitable rigid substrate may be used and in some embodiments may be selected from the group consisting of glass, polycarbonate, biaxially oriented PET, copolyesters, acrylic, and combinations thereof. When the rigid substrate includes glass, the glass can be selected from the group listed previously. When the rigid substrate includes a polymeric material, the polymeric material may or may not include a hard coat surface layer. In some embodiments, the multilayer panels include a pair of rigid substrates with the resin interlayer disposed therebetween. The panels can be used for a variety of end use applications, including, for example, for automotive windshields and windows, aircraft windshields and windows, panels for various transportation applications such as marine applications, rail applications, etc., structural architectural panels such as windows, doors, stairs, walkways, balusters, decorative architectural panels, weather-resistant panels, such as hurricane glass or tornado glass, ballistic panels, and other similar applications.

When laminating the resin layers or interlayers between two rigid substrates, such as glass, the process can include at least the following steps: (1) assembly of the two substrates and the interlayer; (2) heating the assembly via an IR radiant or convective device for a first, short period of time; (3) passing the assembly into a pressure nip roll for the first de-airing; (4) heating the assembly for a short period of time to about 60° C. to about 120° C. to give the assembly enough temporary adhesion to seal the edge of the interlayer; (5) passing the assembly into a second pressure nip roll to further seal the edge of the interlayer and allow further handling; and (6) autoclaving the assembly at temperature between 135° C. and 150° C. and pressures between 150 psig and 200 psig for about 30 to 90 minutes. Other methods for de-airing the interlayer-glass interface, as described according to some embodiments in steps (2) through (5)

above include vacuum bag and vacuum ring processes, and both may also be used to form interlayers of the present invention as described herein.

In some embodiments, the multiple layer panel may include at least one polymer film disposed on the layer or interlayer, forming a multiple layer panel referred to as a "bilayer." In some embodiments, the interlayer utilized in a bilayer may include a multilayer interlayer, while, in other embodiments, a monolithic interlayer may be used. The use of a polymer film in multiple layer panels as described herein may enhance the optical character of the final panel, while also providing other performance improvements, such as infrared absorption. Polymer films differ from polymer layers or interlayers in that the films alone do not provide the necessary penetration resistance and glass retention properties. The polymer film can also be thinner than the sheet, and may have a thickness in the range of from 0.001 to 0.25 mm. Poly(ethylene terephthalate) ("PET") is one example of a material used to form the polymer film.

The following examples are intended to be illustrative of the present invention in order to teach one of ordinary skill in the art to make and use the invention and are not intended to limit the scope of the invention in any way.

EXAMPLES

The following Examples describe the preparation of several resin compositions, layers, and interlayers that include various poly(vinyl acetal) reins. As described below, several tests performed on many of the compositions, layers, and interlayers were used to evaluate the acoustic and optical properties of several comparative and inventive materials.

Example 1

Preparation of High Refractive Index Poly(Vinyl Acetal) Resins

Several comparative poly(vinyl acetal) resins, referred to as Comparative Resins CR-1 through CR-12 in Table 2 below, were prepared by acetalizing polyvinyl alcohol with one or more aldehydes including n-butyraldehyde (nBu-CHO; RI=1.377), iso-butyraldehyde (iBuCHO; RI=1.374), and 2-ethylhexyl aldehyde (2EHCHO; RI=1.414). The composition of the resulting resins were measured using either the ASTM D1396 or FT-IR/SEC method described in detail previously. The refractive index and glass transition temperature ($T_g$) of several of the resins was also measured according to the methods described previously, and the results are provided in Table 2, below.

TABLE 2

Properties of Several Comparative Poly(vinyl acetal) Resins

| Resin | Residual Hydroxyl (wt %) | Residual Acetate (wt %) | Residual Polyvinyl nBuCHO (wt %) | Residual Polyvinyl iBuCHO (wt %) | Residual Polyvinyl 2EHCHO (wt %) | Resin Refractive Index (nD25) |
|---|---|---|---|---|---|---|
| CR-1 | 21 | 1 | 78 | — | — | 1.491 |
| CR-2 | 19 | 1 | 80 | — | — | 1.490 |
| CR-3 | 19 | 1 | 46 | — | 34 | 1.489 |
| CR-4 | 16 | 1 | 83 | — | — | 1.488 |
| CR-5 | 15 | 1 | 39 | — | 45 | 1.487 |
| CR-6 | 13 | 1 | 86 | — | — | 1.486 |
| CR-7 | 12 | 18 | 70 | — | — | 1.481 |
| CR-8 | 12 | 12 | 76 | — | — | nd |
| CR-9 | 12 | 10 | 78 | — | — | 1.483 |
| CR-10 | 11 | 1 | 88 | — | — | 1.485 |
| CR-11 | 12 | 1 | — | 88 | — | nd |
| CR-12 | 13 | 1 | — | 86 | — | nd | nd = not determined

Additionally, several poly(vinyl acetal) resins according to embodiments of the present invention were also prepared in a similar manner. These inventive resins, referred to as Disclosed Resins DR-1 through DR-21 in Table 3, were formed by acetalizing polyvinyl alcohol with mixtures of n-butyraldehyde and various high refractive index aldehydes, including benzaldehyde (BzCHO RI=1.545), cinnamaldehyde (CCHO; RI=1.620), 4-chlorobenzaldehyde (4-ClBzCHO; RI=1.5850), 2-phenylpropionaldehyde (2PH-PrCHO; RI=1.517), and hydrocinnamaldehyde (HCCHO; RI=1.523). The refractive index of several of the Disclosed Resins was also determined and the results are summarized in Table 3, below.

TABLE 3

Properties of Disclosed Resins

| Resin | Residual Hydroxyl (wt %) | Residual Acetate (wt %) | Aldehyde Component (wt %) | HCCHO/ BuCHO (mol/mol) | CCHO/ BuCHO (mol/mol) | 2PhPrCHO/ BuCHO (mol/mol) | BzCHO/ BuCHO (mol/mol) | 4ClBzCHO/ BuCHO (mol/mol) | HCCHO/ iBuCHO | Resin Refractive Index (nD25) |
|---|---|---|---|---|---|---|---|---|---|---|
| DR-1 | 11 | 1 | 88 | 5/95 | — | — | — | — | — | 1.496 |
| DR-2 | 11 | 1 | 88 | 10/90 | — | — | — | — | — | 1.500 |
| DR-3 | 11 | 1 | 88 | 15/85 | — | — | — | — | — | 1.504 |
| DR-4 | 11 | 1 | 88 | 20/80 | — | — | — | — | — | 1.510 |
| DR-5 | 11 | 1 | 88 | 25/75 | — | — | — | — | — | 1.511 |

TABLE 3-continued

Properties of Disclosed Resins

| Resin | Residual Hydroxyl (wt %) | Residual Acetate (wt %) | Aldehyde Component (wt %) | HCCHO/ BuCHO (mol/mol) | CCHO/ BuCHO (mol/mol) | 2PhPrCHO/ BuCHO (mol/mol) | BzCHO/ BuCHO (mol/mol) | 4ClBzCHO/ BuCHO (mol/mol) | HCCHO/ iBuCHO | Resin Refractive Index (nD25) |
|---|---|---|---|---|---|---|---|---|---|---|
| DR-6  | 11 | 1  | 88 | 50/50  | —     | —     | —     | —     | —     | 1.528 |
| DR-7  | 11 | 1  | 88 | 100/0  | —     | —     | —     | —     | —     | 1.552 |
| DR-8  | 19 | 1  | 80 | 10/90  | —     | —     | —     | —     | —     | nd    |
| DR-9  | 19 | 1  | 80 | 25/75  | —     | —     | —     | —     | —     | nd    |
| DR-10 | 19 | 1  | 80 | 50/50  | —     | —     | —     | —     | —     | nd    |
| DR-11 | 19 | 1  | 80 | 100/0  | —     | —     | —     | —     | —     | nd    |
| DR-12 | 12 | 18 | 70 | 25/75  | —     | —     | —     | —     | —     | nd    |
| DR-13 | 12 | 10 | 78 | 25/75  | —     | —     | —     | —     | —     | nd    |
| DR-14 | 17 | 1  | 82 | —      | 25/75 | —     | —     | —     | —     | 1.507 |
| DR-15 | 15 | 1  | 84 | —      | —     | 25/75 | —     | —     | —     | 1.505 |
| DR-16 | 14 | 1  | 85 | —      | —     | 25/75 | —     | —     | —     | 1.503 |
| DR-17 | 18 | 1  | 81 | —      | —     | —     | 25/75 | —     | —     | 1.507 |
| DR-18 | 14 | 1  | 85 | —      | —     | —     | 25/75 | —     | —     | 1.501 |
| DR-19 | 20 | 1  | 79 | —      | —     | —     | —     | 25/75 | —     | 1.507 |
| DR-20 | 14 | 1  | 85 | —      | —     | —     | —     | 25/75 | —     | 1.509 |
| DR-21 | 11 | 1  | 88 | —      | —     | —     | —     | —     | 25/75 | nd    | nd = not determined

As shown in Tables 2 and 3, above, polyvinyl acetal resins comprising residues of at least one high refractive index aldehyde, including those listed above, tend to exhibit higher refractive indices than those comprising residues of aldehydes such as n-butyraldehyde, iso-butyraldehyde, and 2-ethylhexyl aldehyde.

Example 2

Preparation of High Refractive Index Resin Interlayers

Several Comparative and Disclosed Interlayers were formed by mixing and melt blending several of the Comparative Resins listed in Table 2 and several of the Disclosed Resins listed in Table 3 above, with varying amounts of the plasticizer triethylene glycol bis(2-ethylhexanoate) (3GEH). The composition, refractive index, and glass transition temperature of each of the resulting interlayers, referred to as Comparative Interlayers CL-1 through CL-14 and Disclosed Interlayers DL-1 through DL-26, were measured as described previously, and the results are respectively summarized in Tables 4 and 5, below.

TABLE 4

Properties of Several Comparative Interlayers

| Interlayer | Resin | Plasticizer (phr) | Refractive Index (nD25) | $T_g$ (° C.) |
|---|---|---|---|---|
| CL-1  | CR-1  | 34 | 1.478 | 36 |
| CL-2  | CR-2  | 38 | 1.477 | 30 |
| CL-3  | CR-3  | 38 | 1.475 | 28 |
| CL-4  | CR-4  | 50 | 1.472 | 17 |
| CL-5  | CR-4  | 30 | 1.477 | 30 |
| CL-6  | CR-5  | 75 | 1.468 | 6 |
| CL-7  | CR-6  | 75 | 1.467 | 2 |
| CL-8  | CR-7  | 75 | 1.464 | -4 |
| CL-9  | CR-8  | 75 | 1.466 | -3 |
| CL-10 | CR-9  | 75 | 1.465 | -3 |
| CL-11 | CR-10 | 75 | 1.466 | -2 |
| CL-12 | CR-10 | 50 | 1.47  | 12 |
| CL-13 | CR-11 | 75 | nd | nd |
| CL-14 | CR-12 | 75 | nd | nd | nd = not determined

TABLE 5

Properties of Several Disclosed Interlayers

| Interlayer | Resin | Plasticizer content (phr) | Sheet Refractive Index (nD25) | $T_g$ (° C.) |
|---|---|---|---|---|
| DL-1  | DR-1  | 75 | 1.473 | 1 |
| DL-2  | DR-1  | 50 | 1.479 | 12 |
| DL-3  | DR-2  | 75 | 1.475 | 0 |
| DL-4  | DR-3  | 75 | 1.477 | 0 |
| DL-5  | DR-4  | 75 | 1.480 | 1 |
| DL-6  | DR-5  | 75 | 1.482 | 1 |
| DL-7  | DR-6  | 75 | 1.490 | 2 |
| DL-8  | DR-7  | 75 | 1.506 | 3 |
| DL-9  | DR-14 | 75 | 1.480 | 12 |
| DL-10 | DR-15 | 75 | 1.478 | 11 |
| DL-11 | DR-16 | 75 | 1.477 | 7 |
| DL-12 | DR-17 | 75 | 1.480 | 22 |
| DL-13 | DR-18 | 75 | 1.476 | 12 |
| DL-14 | DR-19 | 75 | 1.480 | 17 |
| DL-15 | DR-20 | 75 | 1.479 | 12 |
| DL-16 | DR-12 | 75 | nd | nd |
| DL-17 | DR-13 | 75 | nd | nd |
| DL-18 | DR-21 | 75 | nd | nd |
| DL-19 | DR-8  | 38 | 1.477 | 30 |
| DL-20 | DR-9  | 38 | 1.487 | nd |
| DL-21 | DR-10 | 38 | 1.501 | nd |
| DL-22 | DR-11 | 38 | 1.525 | nd |
| DL-23 | DR-5  | 38 | nd    | nd |
| DL-24 | DR-5  | 50 | 1.488 | nd |
| DL-25 | DR-5  | 60 | 1.484 | 2 |
| DL-26 | DR-7  | 38 | nd    | nd | nd = not determined

As shown in Tables 4 and 5, above, Disclosed Interlayers utilizing higher refractive index Disclosed Resins from Table 3 exhibit higher refractive indices than Comparative Interlayers formulated with lower refractive index resins, such as the Comparative Resins listed in Table 2. Additionally, as shown by comparison of Disclosed Interlayers DL-1 and DL-2 and DL-6 and DL-23 through DL-25, the amount of plasticizer used to form an interlayer affects both the glass transition temperature and refractive index of the layer, although not necessarily to the same extent for all resins. For example, as shown by the comparison of DL-1 (75 phr 3GEH; Disclosed Resin 1) and DL-2 (50 phr 3GEH; Disclosed Resin 1), reducing the amount of plasticizer by about 33 percent increases the glass transition temperature of the interlayer by 11° C. (from 1° C. to 12° C.), but only increases the refractive index by 0.006 (from 1.473 to 1.479). However, as shown by the comparison of DL-25 (60 phr 3GEH; Disclosed Resin 5) and DL-6 (75 phr of 3GEH; Disclosed Resin 5), reducing the plasticizer content in layers formed by this resin increases the glass transition temperature by only 1° C. (from 1° C. to 2° C.), while increasing the refractive index by 0.004 (from 1.484 to 1.488).

Example 3

Preparation of Interlayers Using High Refractive Index Resins

Several of the Comparative and Disclosed Interlayers formed in Example 2 and respectively summarized in Tables 4 and 5, above, were used to create several Comparative and Disclosed Multilayer Interlayers. Each multilayer interlayer included a pair of outer "skin" layers, having a total thickness of 28 mils, sandwiching an inner "core" layer having a thickness of 5 mils, usually formed of a resin having a lower residual hydroxyl content. The composition and several properties of the interlayers including refractive index, glass transition temperature, mottle, and loss factor, were measured as described above, and the results for the Comparative Multilayer Interlayers (CI-1 to CI-16) and Disclosed Multilayer Interlayers (DI-1 to DI-29) are summarized in Tables 6 and 7, below.

TABLE 6

Properties of Several Comparative Multilayer Interlayers

| Interlayer | Resin Layer | | | $T_g$ (° C.) | | | Refractive Index | | | Δ Refractive Index (Skin − Core) | Refractive Index of Interlayer (nD25) | Mottle | Loss Factor at 20° C. |
| --- | --- | --- | --- | --- | --- | --- | --- | --- | --- | --- | --- | --- | --- |
| | Skin 1 | Core | Skin 2 | Skin 1 | Core | Skin 2 | Skin 1 | Core | Skin 2 | | | | |
| CI-1 | CL-2 | CL-7 | CL-2 | 30 | 2 | 30 | 1.477 | 1.467 | 1.477 | 0.010 | 1.475 | 4 | 0.29 |
| CI-2 | CL-2 | CL-11 | CL-2 | 30 | −2 | 30 | 1.477 | 1.466 | 1.477 | 0.011 | 1.475 | 5 | 0.33 |
| CI-3 | CL-2 | CL-8 | CL-2 | 30 | −4 | 30 | 1.477 | 1.464 | 1.477 | 0.013 | 1.475 | 5 | nd |
| CI-4 | CL-1 | CL-9 | CL-1 | 36 | −3 | 36 | 1.478 | 1.466 | 1.478 | 0.012 | 1.477 | 5 | nd |
| CI-5 | CL-1 | CL-8 | CL-1 | 36 | −4 | 36 | 1.478 | 1.464 | 1.478 | 0.014 | nd | 5 | 0.36 |
| CI-6 | CL-2 | CL-9 | CL-2 | 30 | −3 | 30 | 1.477 | 1.466 | 1.477 | 0.011 | nd | 5 | nd |
| CI-7 | CL-1 | CL-11 | CL-1 | 36 | −2 | 36 | 1.478 | 1.466 | 1.478 | 0.012 | 1.477 | 5 | 0.35 |
| CI-8 | CL-2 | CL-10 | CL-2 | 30 | −3 | 30 | 1.477 | 1.465 | 1.477 | 0.012 | nd | 5 | 0.31 |
| CI-9 | CL-1 | CL-7 | CL-1 | 36 | 2 | 36 | 1.478 | 1.467 | 1.478 | 0.011 | nd | 5 | nd |
| CI-10 | CL-1 | CL-10 | CL-1 | 36 | −3 | 36 | 1.478 | 1.465 | 1.478 | 0.013 | nd | 5 | nd |
| CI-11 | CL-2 | CL-13 | CL-2 | 30 | nd | 30 | nd | nd | nd | nd | nd | >5 | nd |
| CI-12 | CL-2 | CL-14 | CL-2 | 30 | nd | 30 | nd | nd | nd | nd | nd | >5 | nd |
| CI-13 | CL-1 | CL-13 | CL-1 | 36 | nd | 36 | nd | nd | nd | nd | nd | >5 | nd |
| CI-14 | CL-1 | CL-14 | CL-1 | 36 | nd | 36 | nd | nd | nd | nd | nd | >5 | nd |
| CI-15 | CL-2 | DL-7 | CL-2 | 30 | 2 | 30 | 1.477 | 1.490 | 1.477 | −0.013 | 1.479 | >5 | nd |
| CI-16 | CL-2 | DL-8 | CL-2 | 30 | 3 | 30 | 1.477 | 1.506 | 1.477 | −0.029 | 1.481 | >5 | nd | nd = not determined

TABLE 7

Properties of Some Disclosed Multilayer Interlayers

| Interlayer | Resin Layer | | | $T_g$ (° C.) | | | Refractive Index (nD25) | | | Δ Refractive Index (Skin − Core) | Refractive Index of Interlayer | Mottle |
| --- | --- | --- | --- | --- | --- | --- | --- | --- | --- | --- | --- | --- |
| | Skin 1 | Core | Skin 2 | Skin 1 | Core | Skin 2 | Skin 1 | Core | Skin 2 | | | |
| DI-1 | CL-2 | DL-1 | CL-2 | 30 | 1 | 30 | 1.477 | 1.473 | 1.477 | 0.004 | 1.476 | 1 |
| DI-2 | CL-2 | DL-4 | CL-2 | 30 | 0 | 30 | 1.477 | 1.477 | 1.477 | 0.000 | 1.477 | 1 |
| DI-3 | CL-5 | DL-6 | CL-5 | 30 | 1 | 30 | 1.477 | 1.482 | 1.477 | −0.005 | 1.478 | nd |
| DI-4 | CL-2 | DL-6 | CL-2 | 30 | 1 | 30 | 1.477 | 1.482 | 1.477 | −0.005 | nd | <1 |
| DI-5 | CL-1 | DL-6 | CL-1 | 36 | 1 | 36 | 1.478 | 1.482 | 1.478 | −0.004 | nd | <1 |
| DI-6 | CL-2 | DL-3 | CL-2 | 30 | 0 | 30 | 1.477 | 1.475 | 1.477 | 0.002 | nd | <1 |
| DI-7 | CL-2 | DL-5 | CL-2 | 30 | 1 | 30 | 1.477 | 1.480 | 1.477 | −0.003 | nd | <1 |
| DI-8 | CL-2 | DL-6 | CL-1 | 30 | 1 | 36 | 1.477 | 1.482 | 1.478 | −0.005 | nd | <1 |
| DI-9 | CL-2 | DL-6 | CL-5 | 30 | 1 | 30 | 1.477 | 1.482 | 1.477 | −0.005 | nd | <1 |
| DI-10 | CL-2 | DL-16 | CL-2 | 30 | nd | 30 | 1.477 | nd | 1.477 | nd | nd | <1 |
| DI-11 | CL-2 | DL-17 | CL-2 | 30 | nd | 30 | 1.477 | nd | 1.477 | nd | nd | <1 |
| DI-12 | CL-1 | DL-16 | CL-1 | 36 | nd | 36 | 1.478 | nd | 1.478 | nd | nd | <1 |

TABLE 7-continued

Properties of Some Disclosed Multilayer Interlayers

| Interlayer | Resin Layer | | | $T_g$ (° C.) | | | Refractive Index (nD25) | | | Δ Refractive Index (Skin – Core) | Refractive Index of Interlayer | Mottle |
|---|---|---|---|---|---|---|---|---|---|---|---|---|
| | Skin 1 | Core | Skin 2 | Skin 1 | Core | Skin 2 | Skin 1 | Core | Skin 2 | | | |
| DI-13 | CL-1 | DL-17 | CL-1 | 36 | nd | 36 | 1.478 | nd | 1.478 | nd | nd | <1 |
| DI-14 | CL-2 | DL-18 | CL-2 | 30 | nd | 30 | 1.477 | nd | 1.477 | nd | nd | <1 |
| DI-15 | CL-1 | DL-18 | CL-1 | 36 | nd | 36 | 1.478 | nd | 1.478 | nd | nd | <1 |
| DI-16 | DL-19 | DL-24 | DL-19 | 30 | 1 | 30 | 1.477 | 1.488 | 1.477 | −0.005 | 1.478 | <1 |
| DI-17 | CL-2 | DL-9 | CL-2 | 30 | 12 | 30 | 1.477 | 1.480 | 1.477 | −0.003 | nd | <1 |
| DI-18 | CL-2 | DL-10 | CL-2 | 30 | 11 | 30 | 1.477 | 1.478 | 1.477 | −0.001 | nd | <1 |
| DI-19 | CL-2 | DL-11 | CL-2 | 30 | 7 | 30 | 1.477 | 1.477 | 1.477 | 0.000 | nd | <1 |
| DI-20 | CL-2 | DL-12 | CL-2 | 30 | 22 | 30 | 1.477 | 1.480 | 1.477 | −0.003 | nd | <1 |
| DI-21 | CL-2 | DL-13 | CL-2 | 30 | 12 | 30 | 1.477 | 1.476 | 1.477 | 0.001 | nd | <1 |
| DI-22 | CL-2 | DL-14 | CL-2 | 30 | 17 | 30 | 1.477 | 1.480 | 1.477 | −0.003 | nd | <1 |
| DI-23 | CL-2 | DL-15 | CL-2 | 30 | 12 | 30 | 1.477 | 1.479 | 1.477 | −0.002 | nd | <1 |
| DI-24 | DL-20 | DL-7 | DL-20 | nd | 2 | nd | 1.487 | 1.490 | 1.487 | −0.003 | nd | <1 |
| DI-25 | DL-21 | DL-7 | DL-21 | nd | 2 | nd | 1.501 | 1.490 | 1.501 | −0.011 | nd | >5 |
| DI-26 | DL-22 | DL-7 | DL-22 | nd | 2 | nd | 1.525 | 1.490 | 1.525 | −0.035 | nd | >5 |
| DI-27 | DL-20 | DL-8 | DL-20 | nd | 3 | nd | 1.487 | 1.506 | 1.487 | −0.009 | nd | 3 |
| DI-28 | DL-21 | DL-8 | DL-21 | nd | 3 | nd | 1.501 | 1.506 | 1.501 | −0.005 | nd | <1 |
| DI-29 | DL-22 | DL-8 | DL-22 | nd | 3 | nd | 1.525 | 1.506 | 1.525 | −0.019 | nd | >5 | nd = not determined

As shown in Table 6, above, interlayers formed from skin and core layers having refractive index differences of 0.010 or more exhibited optical defects, as indicated by the mottle values greater than 5. As shown in Table 7, however, interlayers formed from skin and core layers having refractive index differences of less than 0.010 exhibited low mottle values of 1 or less. Additionally, as shown in Table 7, such low mottle values were achievable by interlayers having a core layer with a higher or lower refractive index than the skin layer, as long as the absolute value of the difference between the refractive indices of adjacent layers was less than 0.010. Also as shown in Table 7, interlayers formed from skin and core layers both having high RI aldehyde residues and having refractive index differences of greater than 0.010 exhibited high mottle values of 5 or greater.

Example 4

Stability of Multilayer Interlayers

Two Comparative Multilayer Interlayers, CI-2 and CI-7, and two Disclosed Multilayer Interlayers, DI-4 and DI-5, prepared as described in Examples 1-3 above, were tested to determine the relative stability of the interlayers over time. Net plasticizer migration, which was measured by comparing the glass transition temperatures of each layer at an initial time (t=0) and after the layers have achieved equilibrium. The results are summarized in Table 8, below.

TABLE 8

Net Plasticizer Migration and Properties of Exemplary Comparative and Disclosed Interlayers

| Interlayer | $T_g$ at t = 0 (° C.) | | $T_g$ at Equilibrium (° C.) | | $\Delta T_g$ (° C.) | | Δ Refractive Index (Skin – Core) | Mottle |
|---|---|---|---|---|---|---|---|---|
| | $T_g$ Skin | $T_g$ Core | $T_g$ Skin | $T_g$ Core | $\Delta T_g$ Skin | $\Delta T_g$ Core | | |
| CI-2 | 36 | 4.2 | 36 | 4.6 | 0.0 | 0.4 | 0.011 | >5 |
| DI-4 | 36 | 1.4 | 36.4 | 1.4 | 0.4 | 0.0 | −0.005 | <1 |
| CI-7 | 42.5 | 2.2 | 42.5 | 1.4 | 0.0 | −0.8 | 0.012 | >5 |
| DI-5 | 40.9 | 0.2 | 41.7 | −1.8 | 0.8 | −2.0 | −0.004 | <1 |

Disclosed Interlayer DI-4 exhibited minimal changes in the glass transition temperature of both the skin and core layers of the interlayer at equilibrium. This indicates a minor amount of plasticizer migration between the skin and core layers of each of Interlayers CI-2, CI-7, and DI-4. Although Comparative Interlayers CI-2 and CI-7 may be relatively stable, both exhibited a mottle value greater than 5, which would be unacceptable for most optical applications. In contrast, the mottle value exhibited by Disclosed Interlayer DI-4 was less than 1.

The slight decrease in glass transition temperature exhibited by Disclosed Interlayer DI-5 at equilibrium indicated that a small amount of plasticizer migrated from the skin layer to the core layer. Such migration could be alleviated by utilizing a smaller amount of plasticizer in the skin layer or a larger amount in the core. Even so, the refractive index of the core layer and the skin layer of Disclosed Interlayer DI-5 differed by only 0.004 and, as a result, the interlayer also exhibited a mottle value less than 1.

Example 5

Blended Poly(Vinyl Acetal) Resins

Several Comparative and Disclosed Resins, prepared as described in Example 1 above, were mixed and melt-blended together with 38 phr of 3GEH plasticizer to form Comparative Blended Layers CBL-16 and CBL-17 and Disclosed Blended Layers DBL-27 and DBL-28. Comparative Resin Layer CL-2 is listed in Table CL-15 was formulated with Comparative Resin CR-10 and 38 phr of 3GEH, while Disclosed Resin Layers DL-27 and DL-28 were formulated with Disclosed Resins DR-3 and DR-5, respectively, and 38 phr of 3GEH. The haze and percent visual transmittance ($T_{vis}$) for each blended resin interlayer were measured, along with the haze and percent visual transmittance. The results are provided in Table 9, below.

TABLE 9

Haze and Percent Visual Transmittance of Several Resin Layers

| Inter-layer | Position | | | | Property | | |
|---|---|---|---|---|---|---|---|
| | CR-2 (wt %) | CR-10 (wt %) | DR-3 (wt %) | DR-5 (wt %) | Plasticizer content (phr) | Haze (%) | % $T_{vis}$ |
| CL-2 | 100 | — | — | — | 38 | 0.5 | 87.7 |
| CL-15 | — | 100 | — | — | 38 | 0.5 | 87.8 |
| CBL-16 | 96 | 4 | — | — | 38 | 2.1 | 84.3 |
| CBL-17 | 89 | 11 | — | — | 38 | 14.7 | 80.2 |
| DBL-27 | 96 | — | 4 | — | 38 | 0.8 | 87.8 |
| DBL-28 | 89 | — | — | 11 | 38 | 0.6 | 87.8 |
| DL-27 | — | — | 100 | — | 38 | 0.5 | 87.7 |
| DL-28 | — | — | — | 100 | 38 | 0.5 | 87.8 |

As shown in Table 9 above, Comparative Blended Interlayers CBL-16 and CBL-17, which were formed from a blend of Comparative Resins CR-2 and CR-10, exhibited high haze values and lower percent visual transmittance than single resin layers of Comparative Resin CR-2 (Comparative Layer CL-2) or CR-10 (Comparative Interlayer CL-15). In contrast, Disclosed Blended Interlayers DBL-27 and DBL-28, which were formed from a blend of Comparative Resin CR-2 and a high refractive index Disclosed Resin (Resin DR-3 in Layer DBL-27 or Resin DR-5 in Layer DBL-28), exhibited substantially the same haze and percent visual transmittance as Comparative Interlayer CL-2, which was formulated with Comparative Resin CR-2 alone. Thus, addition of inventive high refractive index resins to a comparative interlayer does not reduce the optical quality of the resulting interlayer.

Example 6

Preparation of Interlayers Having High Refractive Index Additives

Several poly(vinyl acetal) resins were prepared by acetalizing polyvinyl alcohol with n-butyraldehyde. The resins, which had different residual hydroxyl contents, were melt blended with varying amounts of a 3GEH plasticizer and used to form various layers of multilayer interlayers. Each interlayer had an inner "core" layer having a thickness of 5 mils sandwiched between two outer "skin" layers, each having a thickness of 14 mils. The poly(vinyl butyral) resin used to form the core layers had a hydroxyl content of 11 weight percent and the resin used for the skin layers had a hydroxyl content of 19 weight percent. Both resins had a residual acetate content of about 2 weight percent.

Comparative Interlayers CI-17 through CI-19 were formed with resin layers plasticized with 3GEH, which was present in varying amounts in the core and skin layers. In addition to the 3GEH, Disclosed Interlayers DI-30 through DI-38 also included varying amounts of two different high refractive index additives, Benzoflex™ 2-45 (diethylenegylcol dibenzoate; commercially available from Eastman Chemical Company, Kingsport, Tenn.) (Additive A-1), which had a melting point of 28° C. and a refractive index of 1.542; and Benzoflex™ 352 (1,4-cyclohexane dimethanol dibenzoate; commercially available from Eastman Chemical Company) (Additive A-2), which had a melting point of 118° C. and a refractive index of 1.554. The refractive index and glass transition temperatures of each of the layers of Comparative Interlayers CI-17 through CI-19 and Disclosed Interlayers DI-30 through DI-38 were measured and the results are summarized in Table 10 below.

TABLE 10

Properties of Several Comparative and Disclosed Interlayers

| Inter-layer | Skin Layers | | | | | | | Core Layer | | | | | | | Δ Refractive Index (Skin − Core) |
|---|---|---|---|---|---|---|---|---|---|---|---|---|---|---|---|
| | Plasticizer Content (P) (phr) | High RI Additive Type | High RI Additive (A) (phr) | Total A + P | A:P Ratio | RI | Tg (° C.) | Plasticizer Content (P) (phr) | High RI Additive Type | High RI Additive (A) (phr) | Total A + P | A:P Ratio | RI | Tg (° C.) | |
| CI-17 | 40 | — | — | — | — | 1.476 | 30 | 65.0 | — | — | — | — | 1.467 | 2.9 | 0.008 |
| CI-18 | 40 | — | — | — | — | 1.476 | 30 | 75.0 | — | — | — | — | 1.466 | −2.0 | 0.010 |
| CI-19 | 40 | — | — | — | — | 1.476 | 30 | 85.0 | — | — | — | — | 1.465 | −3.1 | 0.011 |
| DI-30 | 20 | A-1 | 20 | 40 | 1.0 | 1.492 | 29 | 32.5 | A-1 | 32.5 | 65 | 1.0 | 1.488 | 4.2 | 0.004 |
| DI-31 | 20 | A-1 | 20 | 40 | 1.0 | 1.492 | 29 | 37.5 | A-1 | 37.5 | 75 | 1.0 | 1.488 | −0.6 | 0.004 |
| DI-32 | 20 | A-1 | 20 | 40 | 1.0 | 1.489 | 29 | 42.5 | A-1 | 42.5 | 85 | 1.0 | 1.488 | −3.3 | 0.004 |
| DI-33 | 17.2 | A-1 | 22.8 | 40 | 1.3 | 1.496 | 30 | 22.8 | A-1 | 42.2 | 65 | 1.9 | 1.494 | 5.2 | 0.002 |
| DI-34 | 17.2 | A-1 | 22.8 | 40 | 1.3 | 1.496 | 30 | 26.2 | A-1 | 48.8 | 75 | 1.9 | 1.494 | 2.4 | 0.002 |
| DI-35 | 17.2 | A-1 | 22.8 | 40 | 1.3 | 1.496 | 30 | 29.8 | A-1 | 55.2 | 85 | 1.9 | 1.494 | −2.1 | 0.002 |
| DI-36 | 20 | A-2 | 20 | 40 | 1.0 | 1.493 | 34 | 27.5 | A-2 | 27.5 | 55 | 1.0 | 1.490 | 15.9 | 0.003 |
| DI-37 | 20 | A-2 | 20 | 40 | 1.0 | 1.493 | 34 | 35.0 | A-2 | 35.0 | 70 | 1.0 | 1.490 | 8.4 | 0.003 |
| DI-38 | 20 | A-2 | 20 | 40 | 1.0 | 1.493 | 34 | 42.5 | A-2 | 42.5 | 85 | 1.0 | 1.491 | 1.8 | 0.002 |

As shown in Table 10, above, increasing the plasticizer content of the core layer of an interlayer that only included a 3GEH plasticizer reduced the glass transition temperature of the layer, which, ultimately, would have improved its acoustic performance. However, such an increase also widened the difference between the refractive indices of the skin and core layers, thereby reducing the optical quality of the interlayer. As shown by comparison with Disclosed Interlayers DI-30 through DI-38 in Table 10, the refractive index of core layers formulated with an additional high refractive index additive, remained fairly constant with increased plasticizer loading, while still exhibiting a similar reduction in glass transition temperature. The result was an interlayer having core and skin layers with nearly the same refractive index, which greatly reduced optical defects such as mottle. At the same time, the core layer also exhibited a sufficiently low glass transition temperature, indicating that the resin also had acoustic properties.

Example 7

Preparation of Core Layers Having Reactive High Refractive Index Additives

Several resin layers, used to simulate the inner core layer of a multilayer interlayer, were formed by melt blending a polyvinyl n-butyral resin having a residual hydroxyl content of 11 weight percent and a residual acetate content of about 2 weight percent with varying amounts of 3GEH plasticizer. Comparative Layer CL-16 included 75 phr of 3GEH, while Disclosed Layers DL-29 through DL-31 were formulated with various mixtures of 3GEH and a reactive high refractive index additive (reactive high RI additive). The reactive high RI additive used in Disclosed Layers DL-29 and DL-30 (Additive A) was diphenyldimethoxysilane (commercially available as SID4535.0 from Gelest, Inc., Morrisville, Pa.), and the reactive high RI additive used in Disclosed Layer DL-31 (Additive B) was phthalic anhydride (commercially available from Sigma Aldrich Co., St. Louis, Mo.). The refractive index of Comparative Layer CL-16 and each of Disclosed Layers DL-29 through DL-31 was measured and the results are provided in Table 11, below.

through DL-31 as a core layer exhibit fewer optical defects than multilayer interlayers formed with Comparative Layer CL-16 as an inner core layer.

Example 8

Various Interlayers with Resin Blends Having a High Refractive Index Plasticizer Two polyvinyl n-butyral resins, R-1 and R-2, were prepared according to the procedure described above in Example 1. Resin R-1 had a residual hydroxyl content of 19 weight percent, while resin R-2 had a residual hydroxyl content of 11 weight percent. Both resins had residual acetate contents of 2 weight percent. Several resin blends were prepared that included varying amounts of resins R-1 and R-2 in order to simulate various blending rates. The blends were combined with 38 phr of a plasticizer selected from 3GEH (plasticizer P-1; RI=1.442), dioctyl phthalate (plasticizer P-2; RI=1.485), a blend of 30 weight percent 3GEH and 70 weight percent Benzoflex® 2088, which is commercially available from Eastman Chemical Company, Kingsport, Tenn., (plasticizer P-3; RI=1.506), and nonylphenyl tetraethylene glycol (plasticizer P-4; RI=1.500). The resulting plasticized resins were then formed into single sheets that included both resins and the plasticizer. The refractive index, haze, and percent visual transmittance was determined for each sheet and the results are provided in Table 12, below.

TABLE 12

Properties of Several Resin Blends

| | | Plasticizer P-1 | | | Plasticizer P-2 | | | Plasticizer P-3 | | | Plasticizer P-4 | | |
|---|---|---|---|---|---|---|---|---|---|---|---|---|---|
| Resin A (wt %) | Resin B (wt %) | RI of Interlayer | Haze (%) | $T_{vis}$ (%) | RI of Interlayer | Haze (%) | $T_{vis}$ (%) | RI of Interlayer | Haze (%) | $T_{vis}$ (%) | RI of Interlayer | Haze (%) | $T_{vis}$ (%) |
| 100 | 0 | 1.477 | 0.4 | 88.5 | 1.494 | 0.4 | 88.5 | 1.495 | 0.3 | 88.4 | 1.493 | 0.3 | 88.5 |
| 98.9 | 1.1 | 1.477 | 0.6 | 87.9 | 1.494 | 0.4 | 88.6 | 1.495 | 0.3 | 88.8 | 1.493 | 0.3 | 88.7 |
| 97.8 | 2.2 | 1.476 | 1.2 | 87.1 | 1.498 | 0.3 | 88.4 | 1.495 | 0.3 | 88.7 | 1.493 | 0.2 | 88.7 |
| 95.6 | 4.4 | 1.477 | 1.9 | 84.6 | 1.495 | 0.4 | 88.4 | 1.495 | 0.3 | 88.6 | 1.492 | 0.4 | 88.5 |
| 91.2 | 8.8 | 1.476 | 5.4 | 81.7 | 1.495 | 0.5 | 88.3 | 1.495 | 0.4 | 88.5 | 1.493 | 0.3 | 88.6 |
| 88.9 | 11.1 | 1.476 | 12.9 | 80.6 | 1.494 | 0.6 | 88.2 | 1.495 | 0.4 | 88.2 | 1.492 | 0.4 | 88.2 |

TABLE 11

Refractive Index of Comparative and Disclosed Core Resin Layers

| Resin Layer | Plasticizer Content (phr) | Additive A Content (phr) | Additive B Content (phr) | Refractive Index (nD25) |
|---|---|---|---|---|
| CL-16 | 75 | — | — | 1.466 |
| DL-29 | 72 | 3 | — | 1.468 |
| DL-30 | 72 | 6 | — | 1.470 |
| DL-31 | 72 | — | 3 | 1.470 |

As shown in Table 11, resin layers formed using 3GEH in combination with one or more reactive high refractive index additives had a higher refractive index than resin layers formulated with only 3GEH. As a result, when employed as an inner core layer in a multilayer interlayer, the Disclosed Layers DL-29 through DL-31 had a refractive index that more closely matched the refractive index of a skin layer formed of polyvinyl n-butyral (RI=1.477). As a result, multilayer interlayers formed with Disclosed Layers DL-29

As shown in Table 12, above, although blended resin layers formulated with plasticizer P-1 maintained a substantially constant refractive index with increasing amounts of the lower hydroxyl content resin R-2, the optical properties of these resin blends having high levels of R-2 worsened as the amount of R-2 increased. For example, as shown in Table 12, the haze of blends that included more than 1.1 percent of resin R-2 increased, while the percent visual transmittance of these blends decreased from 88.5 percent to 81.7 percent.

In contrast, the resin blends including more than 2.2 percent of resin R-2 that were plasticized with higher refractive index plasticizers P-2 through P-4, each exhibited substantially the same haze value and percent visual transmittance as blends having lower amounts of resin R-2. Therefore, it can be concluded that the resin blends utilizing higher refractive index plasticizers, such as plasticizers P-2 through P-4, may permit higher amounts of lower hydroxyl content resins without adversely impacting the optical properties of the final blend.

Example 9

Poly(Vinyl Butyral) Layers Including a High Refractive Index Plasticizer

Several poly(vinyl n-butyral) layers were formed by combining and melt blending three different poly(vinyl n-butyral) resins (PVB-1 through PVB-3) with different types and amounts of plasticizer. Each of the resins PVB-1 through PBV-3 had a different residual hydroxyl content, ranging from 11 to 20.4 weight percent, and all three resins had a residual vinyl acetate content of 1 weight percent. Comparative Layers CL-17 through CL-19 were formulated with varying amounts of triethylene glycol di-(2-ethyl-hexanoate) ("3GEH"; RI=1.442), while Disclosed Layers DL-32 through DL-37 included a mixture of 3GEH with Benzoflex™ 354 (commercially available from Eastman Chemical Company, Kingsport, Tenn.)(RI=1.53). The refractive index of each layer was measured and the results are summarized in Table 13, below.

TABLE 13

Several Poly(vinyl) Butyral Layers with Various Plasticizers

| Resin Layer | Residual hydroxyl content (wt %) | Plasticizer Content | | | Total plasticizer content (phr) | Refractive Index (nD25) |
|---|---|---|---|---|---|---|
| | | 3GEH content (phr) | Benzoflex™ 354 (phr) | Ratio of 3GEH to Benzoflex™ 354 | | |
| CL-17 | 19 | 38 | — | — | 38 | 1.477 |
| CL-18 | 19 | 38 | — | — | 38 | 1.477 |
| CL-19 | 11 | 75 | — | — | 38 | 1.466 |
| DL-32 | 20.4 | 30.1 | 12.9 | 30/70 | 43 | 1.484 |
| DL-33 | 20.4 | 25.8 | 17.2 | 40/60 | 43 | 1.485 |
| DL-34 | 20.4 | 21.5 | 21.5 | 50/50 | 43 | 1.488 |
| DL-35 | 11 | 59.5 | 25.5 | 30/70 | 85 | 1.479 |
| DL-36 | 11 | 51 | 34 | 40/60 | 85 | 1.481 |
| DL-37 | 11 | 42.5 | 42.5 | 50/50 | 85 | 1.486 |

As shown in Table 13, above, resin layers that included a high refractive index plasticizer exhibited a higher refractive index than those that included only a low refractive index plasticizer.

Example 10

Preparation of Interlayers Having High Refractive Index Additives

Several of the Comparative and Disclosed Interlayers formed in Example 9 and summarized in Table 13, above, were used to create several Comparative and Disclosed Multilayer Interlayers. Each multilayer interlayer included a pair of outer "skin" layers, each having a thickness of 14 mils, sandwiching an inner "core" layer, having a thickness of 5 mils, formed of a resin having a lower residual hydroxyl content. The composition and several properties of the multilayer interlayers, including total plasticizer content, refractive index, glass transition temperature, mottle, and loss factor, were measured as described above, and the results for the Comparative Multilayer Interlayers CI-20 and CI-21 and Disclosed Multilayer Interlayers DI-39 through DI-41 are summarized in Table 14, below.

TABLE 14

Properties of Several Comparative and Disclosed Interlayers

| Interlayer No | Skin Layer 1 | Core Layer | Skin Layer 2 | Total plasticizer content (phr) | Δ Refractive Index (Skin − Core) | Refractive Index (nD25) | $T_g$ (° C.) Skin | $T_g$ (° C.) Core | Mottle | Loss Factor at 20° C. |
|---|---|---|---|---|---|---|---|---|---|---|
| CI-20 | CL-17 | CL-18 | CL-17 | 38 | 0.000 | 1.477 | 30 | — | 0 | 0.02 |
| CI-21 | CL-17 | CL-19 | CL-17 | 42.5 | 0.011 | 1.475 | 35 | 3 | 5 | 0.32 |

TABLE 14-continued

Properties of Several Comparative and Disclosed Interlayers

| Interlayer No | Skin Layer 1 | Core Layer | Skin Layer 2 | Total plasticizer content (phr) | Δ Refractive Index (Skin − Core) | Refractive Index (nD25) | $T_g$ (° C.) Skin | $T_g$ (° C.) Core | Mottle | Loss Factor at 20° C. |
|---|---|---|---|---|---|---|---|---|---|---|
| DI-39 | DL-32 | DL-35 | DL-32 | 48 | 0.005 | 1.484 | 38.8 | 2.6 | 0.4 | 0.41 |
| DI-40 | DL-33 | DL-36 | DL-33 | 48 | 0.004 | 1.486 | 39.6 | 4.7 | 0.4 | 0.39 |
| DI-41 | DL-34 | DL-37 | DL-34 | 48 | 0.002 | 1.488 | 40.9 | 8.7 | 0.4 | 0.33 |

As shown in Table 14 above, interlayers formed from skin and core layers having a refractive index difference greater than 0.010 exhibited more optical defects, as shown by the mottle value of 5. Additionally, Disclosed Interlayers DI-39 through DI-41, which utilized a high refractive index plasticizer, exhibited a higher overall refractive index as compared to Comparative Interlayers CI-20 and CI-21, which only utilized a plasticizer having a refractive index less than 1.460.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention It will further be understood that any of the ranges, values, or characteristics given for any single component of the present disclosure can be used interchangeably with any ranges, values or characteristics given for any of the other components of the disclosure, where compatible, to form an embodiment having defined values for each of the components, as given herein throughout. For example, an interlayer can be formed comprising poly(vinyl butyral) having a residual hydroxyl content in any of the ranges given in addition to comprising a plasticizers in any of the ranges given to form many permutations that are within the scope of the present disclosure, but that would be cumbersome to list. Further, ranges provided for a genus or a category, such as phthalates or benzoates, can also be applied to species within the genus or members of the category, such as dioctyl terephthalate, unless otherwise noted.

What is claimed is:

1. An interlayer comprising: a resin layer comprising a poly(vinyl acetal) resin, a plasticizer, and at least one solid RI additive having a refractive index of at least 1.460, wherein said solid RI additive is a physical RI additive selected from polyadipates, polystyrene having a molecular weight of less than 2500, epoxides, phthalic acid esters, benzoic acid esters, and combinations thereof and is present in said resin layer in an amount of at least 5 parts per hundred (phr) or said solid RI additive is an aromatic reactive RI additive and is present in said resin layer in an amount of at least 3 phr, (phr), and wherein the difference in refractive index between the solid RI additive and the poly(vinyl acetal) resin is at least about 0.050 and wherein said resin layer has a glass transition temperature of less than 20° C. and a refractive index of at least 1.470, wherein said interlayer further comprises a second resin layer adjacent to said resin layer, wherein said second resin layer comprises a second poly(vinyl acetal) resin and a second plasticizer, wherein said solid RI additive is present in said resin layer in a sufficient amount so that the absolute value of the difference between the refractive index of said resin layer and the refractive index of said second resin layer is less than 0.010.

2. The interlayer of claim 1, wherein said poly(vinyl acetal) resin comprises at least 50 weight percent of residues of at least one aldehyde selected from the group consisting of n-butyraldehyde, iso-butyraldehyde, 2-ethylhexanal, and combinations thereof, based on the total weight of aldehyde residues of said poly(vinyl acetal) resin.

3. The interlayer of claim 1, wherein said resin layer comprises said RI additive in a higher amount than said second resin layer, wherein the difference between the amount of said solid RI additive in said resin layer and the amount of said solid RI additive in said second resin layer is at least 2 phr.

4. A multiple layer panel comprising the interlayer of claim 1 and at least one rigid substrate.

5. An interlayer comprising:
a first resin layer comprising a first poly(vinyl acetal) resin and a first plasticizer;
a second resin layer adjacent to said first resin layer, wherein said second resin layer comprises a second poly(vinyl acetal) resin and a second plasticizer, wherein said second resin layer has a glass transition temperature that is at least 3° C. higher or lower than the glass transition temperature of said first resin layer; and
a solid refractive index (RI) additive selected from polyadipates, polystyrene having a molecular weight of less than 2500, epoxides, phthalic acid esters, benzoic acid esters, and combinations thereof and aromatic additives present in at least one of said first and said second resin layers,
wherein said solid RI additive is present in said at least one of said first and said second resin layers in an amount such that the absolute value of the difference between the refractive index of said first resin layer and the refractive index of said second resin layer is not more than 0.010,
and wherein the difference in refractive index between the solid RI additive and at least one of the first and second poly(vinyl acetal) resins is at least about 0.050.

6. The interlayer of claim 5, wherein said solid RI additive has a refractive index of at least 1.460 and is present in said second resin layer in an amount of at least 1 phr.

7. The interlayer of claim 6, wherein said solid RI additive is a physical RI additive and is present in said second resin layer in an amount of at least 10 phr and wherein said physical RI additive is present in said first resin layer in an amount of at least 5 phr.

8. The interlayer of claim 6, wherein said solid RI additive is a reactive RI additive and is present in said first resin layer in an amount of less than 0.5 phr.

9. The interlayer of claim 5, wherein said solid RI additive has a melting point of at least about about 27° C.

10. The interlayer of claim 5, wherein each of said first and said second poly(vinyl acetal) resins comprise at least 80 weight percent of an aldehyde selected from the group consisting of n-butyraldehyde, iso-butyraldehyde, 2-ethylhexaldehyde, and combinations thereof, based on the total weight of aldehyde residues of said first or said second poly(vinyl acetal) resin, wherein the glass transition temperature of said first resin layer is at least 26° C. and the glass transition temperature of said second resin layer is not more than than 25° C., wherein the difference between the residual hydroxyl content of said first poly(vinyl acetal) resin and said second poly(vinyl acetal) resin is at least 2 weight percent, and wherein the refractive index of said second resin layer is at least 1.470.

11. A multiple layer panel comprising the interlayer of claim 5 and at least one rigid substrate.

12. An interlayer comprising: a resin layer comprising a poly(vinyl acetal) resin, a plasticizer, and at least one solid RI additive having a refractive index of at least 1.480 wherein said solid RI additive is a physical RI additive selected from polyadipates, polystyrene having a molecular weight of less than 2500, epoxides, phthalic acid esters, benzoic acid esters, and combinations thereof, wherein said solid RI additive is present in said resin layer in an amount of at least 1 part per hundred parts of resin (phr).

13. The interlayer of claim 12, wherein said solid RI additive is present in said resin layer in an amount of at least 5 phr and not more than 50 phr.

14. The interlayer of claim 12, wherein said poly(vinyl acetal) resin comprises at least 50 weight percent of residues of at least one aldehyde selected from the group consisting of n-butyraldehyde, iso-butyraldehyde, 2-ethylhexanal, and combinations thereof, based on the total weight of aldehyde residues of said poly(vinyl acetal) resin and wherein said resin layer has a glass transition temperature of less than at 20° C. and a refractive index of at least 1.470.

15. The interlayer of claim 12, wherein said interlayer further comprises a second resin layer adjacent to said resin layer, wherein said second resin layer comprises a second poly(vinyl acetal) resin and a second plasticizer, wherein said solid RI additive is present in said resin layer in a sufficient amount so that the absolute value of the difference between the refractive index of said resin layer and the refractive index of said second resin layer is less than 0.010.

16. The interlayer of claim 15, wherein each of said first and said second poly(vinyl acetal) resins comprise at least 80 weight percent of an aldehyde selected from the group consisting of n-butyraldehyde, iso-butyraldehyde, 2-ethylhexaldehyde, and combinations thereof, based on the total weight of aldehyde residues of said first or said second poly(vinyl acetal) resin, wherein the glass transition temperature of said first resin layer is at least 26° C. and the glass transition temperature of said second resin layer is not more than 25° C., wherein the difference between the residual hydroxyl content of said first poly(vinyl acetal) resin and said second poly(vinyl acetal) resin is at least 2 weight percent, and wherein the refractive index of said second resin layer is at least 1.470.

17. A multiple layer panel comprising the interlayer of claim 12 and at least one rigid substrate.

\* \* \* \* \*